(12) United States Patent
Wei et al.

(10) Patent No.: US 12,289,057 B2
(45) Date of Patent: Apr. 29, 2025

(54) CIRCUITS AND METHODS FOR CONTROLLING BIDIRECTIONAL CLLC CONVERTERS

(71) Applicant: Wolfspeed, Inc., Durham, NC (US)

(72) Inventors: Chen Wei, Shenzhen (CN); Dongfeng Zhu, Shenzhen (CN); Haitao Xie, Shenzhen (CN); Ying Liu, Shenzhen (CN); Jianwen Shao, Cary, NC (US)

(73) Assignee: Wolfspeed, Inc., Durham, NC (US)

( * ) Notice: Subject to any disclaimer, the term of this patent is extended or adjusted under 35 U.S.C. 154(b) by 210 days.

(21) Appl. No.: 17/788,002

(22) PCT Filed: Dec. 24, 2019

(86) PCT No.: PCT/CN2019/127970
§ 371 (c)(1),
(2) Date: Jun. 22, 2022

(87) PCT Pub. No.: WO2021/127995
PCT Pub. Date: Jul. 1, 2021

(65) Prior Publication Data
US 2023/0040992 A1 Feb. 9, 2023

(51) Int. Cl.
*H02M 3/335* (2006.01)
*H02J 7/02* (2016.01)
(52) U.S. Cl.
CPC ........... *H02M 3/33584* (2013.01); *H02J 7/02* (2013.01); *H02M 3/33573* (2021.05); *H02J 2207/20* (2020.01)

(58) Field of Classification Search
CPC ....... H02M 3/33573–33573; H02J 7/02; H02J 2207/20
See application file for complete search history.

(56) References Cited

U.S. PATENT DOCUMENTS

| 11,909,323 B2 * | 2/2024 | Wang | H02M 3/33584 |
| 12,107,507 B2 * | 10/2024 | Zou | H02M 1/0054 |
| 2016/0365803 A1 * | 12/2016 | Torrico-Bascopé | H02M 3/33546 |

(Continued)

FOREIGN PATENT DOCUMENTS

| CN | 105871215 A | * | 8/2016 | |
| CN | 106787755 A | * | 5/2017 | .......... H02M 3/3353 |
| CN | 108712081 A | * | 10/2018 | .............. H02M 1/08 |

(Continued)

OTHER PUBLICATIONS

Chen et al. "Snubberless Bidirectional DC-DC Converter With New CLLC Resonant Tank Featuring Minimized Switching Loss" IEEE Transactions on Industrial Electronics 57(9) (Sep. 2010).

(Continued)

*Primary Examiner* — Sisay G Tiku
(74) *Attorney, Agent, or Firm* — Myers Bigel, P.A.

(57) ABSTRACT

A bidirectional power converter includes a first switch circuit coupled to a second switch circuit via a transformer, wherein the first switch circuit is configured to transfer power to the second switch circuit during a charging mode, the second switch circuit is configured to transfer power to the first switch circuit during a discharging mode, and the first switch circuit is configured to operate in a half bridge configuration during a first portion of the charging mode.

48 Claims, 18 Drawing Sheets

(56) References Cited

U.S. PATENT DOCUMENTS

2019/0372471 A1* 12/2019 Peng ............... H02M 3/33584
2021/0203237 A1* 7/2021 Hang ............... H02M 3/33584

FOREIGN PATENT DOCUMENTS

| | | | | |
|---|---|---|---|---|
| CN | 109687719 A | | 4/2019 | |
| CN | 209016943 U | | 6/2019 | |
| CN | 110649820 A | * | 1/2020 | |
| CN | 108964476 B | * | 4/2020 | ........ H02M 3/33584 |
| CN | 111064371 A | * | 4/2020 | .............. H02M 1/00 |
| CN | 109687719 B | * | 10/2020 | ........ H02M 3/33584 |
| CN | 112436730 A | * | 3/2021 | .............. B60L 53/22 |
| CN | 109271698 B | * | 9/2022 | .......... G06F 30/367 |
| CN | 115622413 B | * | 3/2023 | |
| CN | 116111619 A | * | 5/2023 | |
| EP | 2940848 A1 | | 11/2015 | |
| JP | 2015177559 A | | 10/2015 | |
| WO | WO-2016012032 A1 | * | 1/2016 | .............. H02M 1/15 |

OTHER PUBLICATIONS

Hao et al. "Urban Rail Transit Power System Integrated with Electric Vehicles Based on CLLC Resonant and Buck-boost Converter" 2018 IEEE International Conference on ESARS-ITEC (Nov. 2018).

Jung et al. "Design Methodology of Bidirectional CLLC Resonant Converter for High-Frequency Isolation of DC Distribution Systems" IEEE Transactions on Power Electronics 28(4) (Apr. 2013).

Kim et al. "High-Efficiency Single-Stage LLC Resonant Converter for Wide-Input-Voltage Range" IEEE Transactions on Power Electronics 33(9) (Sep. 2018).

Iang et al. "A New Wide Input Range High Efficiency Photovoltaic Inverter" 2010 IEEE Energy Conversion Congress and Exposition (Sep. 16, 2010).

Notification of Transmittal of the International Search Report and the Written Opinion of the International Searching Authority, or the Declaration, in corresponding PCT Application No. PCT/CN2019/127970 (9 pages) (Sep. 24, 2020).

* cited by examiner

CIRCUITS AND METHODS FOR CONTROLLING BIDIRECTIONAL CLLC CONVERTERS

CLAIM OF PRIORITY

This application is a 35 U.S.C. § 371 national stage application of PCT Application No. PCT/CN2019/127970, filed on Dec. 24, 2019, the disclosure of which is hereby incorporated herein by reference. The above-referenced PCT Application was published in the English language as International Publication No. WO 2021/127995 A1 on Jul. 1, 2021.

FIELD OF THE INVENTION

The present invention relates generally to bidirectional CLLC converters and, more specifically, to circuits and methods to control bidirectional CLLC converters during charging and discharging modes.

BACKGROUND

Electric power applications such as battery chargers, electric vehicles (EV), renewable energy sources, uninterruptible power supplies (UPS), and smart grid power systems utilize bidirectional DC—DC converters to interface between device and/or power sources that can both consume and provide DC power.

The trend of power conversion systems for EV and energy storage is towards high efficiency, high power density, and bidirectional operation. Bidirectional CLLC converters have become very popular in bidirectional DC-DC power conversion applications due to their zero voltage switching (ZVS) operation in bidirectional operation mode, as discussed in Wei Chen et al., "Snubberless Bidirectional DC—DC Converter With New CLLC Resonant Tank Featuring Minimized Switching Loss," IEEE Transactions on Industrial Electronics, Vol. 57, No. 9, Sept. 2010. As used herein, "CLLC" refers to the resonant combination of circuit elements including capacitance (C) and inductance (L). In some cases with such circuits, ZVS operation, and thus a reduction in switching losses, may only be possible for on switching, and hard switching (e.g., with corresponding switching losses) may still be present for off switching.

To achieve high efficiency, good thermal performance, and a reduction in electromagnetic interference (EMI), it may be useful to have a proper design of the turns ratio of a transformer utilized in the CLLC bidirectional converter, so as to minimize the switching frequency and turn off current of the converter under heavy load when the gain is less than the gain at resonant frequency. However, in some applications such as an EV on-board charger (OBC), the required output voltage range of the DC-DC converter may vary widely when operating in a charging mode. Also, both vehicle-to-grid (V2G) operation (e.g., where an EV may provide power to a power grid) and vehicle-to-load (V2L) operation (e.g., where an EV may provide power to a connected load, may have wide DC input voltage ranges while the required output voltage range of the DC-DC converter may also be wide. As a result, designing the turn ratio of the transformer to support applications with such widely-varying ranges may be difficult.

A two stage structure incorporating a buck/boost converter followed by a CLLC converter, or a CLLC converter followed by a buck/boost converter, have been studied before, as discussed in Liu Hao et al., "Urban Rail Transit Power System Integrated with Electric Vehicles Based on CLLC Resonant and Buck-boost Converter," 2018 IEEE International Conference on Electrical Systems for Aircraft, Railway, Ship Propulsion and Road Vehicles & International Transportation Electrification Conference (ESARS-ITEC). However, an additional buck/boost converter may increase the system cost and impact the system efficiency and power density.

Relay based flexible control has also been studied in adaptor applications, as discussed in Chong-Eun Kim et al., "High-Efficiency Single-Stage LLC Resonant Converter for Wide-Input-Voltage Range," IEEE Transactions on Power Electronics, Sept. 2018, Vol. 33, No. 9. In such devices, mechanical relays may be used to change the turns ratio of the transformer in different operation modes. However, the relay based approach also increases the system cost and impacts the system efficiency and power density.

SUMMARY

Pursuant to some embodiments of the present invention, a bidirectional power converter includes a first switch circuit coupled to a second switch circuit via a transformer, wherein the first switch circuit is configured to transfer power to the second switch circuit during a charging mode, the second switch circuit is configured to transfer power to the first switch circuit during a discharging mode, and the first switch circuit is configured to operate in a half bridge configuration during a first portion of the charging mode.

In some embodiments, the first switch circuit is further configured to operate in a full bridge synchronous rectifier configuration during a first portion of the discharging mode.

In some embodiments, the second switch circuit is configured to operate as a full bridge synchronous rectifier during the first portion of the charging mode.

In some embodiments, a first switch (e.g., Q4) and a second switch (e.g., Q3) of the first switch circuit are configured to be simultaneously active during part of the first portion of the charging mode.

In some embodiments, the first switch (e.g., Q4) is configured to transition from a deactivation state to an activation state at substantially the same time that the second switch (e.g., Q3) is configured to transition from a deactivation state to an activation state during the first portion of the charging mode.

In some embodiments, the first switch (e.g., Q4) is configured to transition from an activation state to a deactivation state at substantially the same time that the second switch (e.g., Q3) is configured to transition from an activation state to a deactivation state during the first portion of the charging mode.

In some embodiments, during the first portion of the charging mode, the first switch (e.g., Q4) is pulse-width modulated at a first frequency with a first duty cycle and the second switch (e.g., Q3) is pulse-width modulated at a second frequency with a second duty cycle, the first frequency is substantially the same as the second frequency, and the first duty cycle has a different duration than the second duty cycle.

In some embodiments, the first switch (e.g., Q4) and a third switch (e.g., Q1) of the first switch circuit are configured to be simultaneously active during another part of the first portion of the charging mode.

In some embodiments, a fourth switch (e.g., Q7) and a fifth switch (e.g., Q8) of the second switch circuit are configured to be simultaneously active during part of the first portion of the discharging mode.

In some embodiments, the fourth switch (e.g., Q7) is configured to transition from a deactivation state to an activation state at substantially the same time that the fifth switch (e.g., Q8) is configured to transition from a deactivation state to an activation state during the first portion of the discharging mode.

In some embodiments, the fourth switch (e.g., Q7) is configured to transition from an activation state to a deactivation state at substantially the same time that the fifth switch (e.g., Q8) is configured to transition from an activation state to a deactivation state during the first portion of the discharging mode.

In some embodiments, during the first portion of the discharging mode, the fourth switch (e.g., Q7) is pulse-width modulated at a fourth frequency with a fourth duty cycle and the fifth switch (e.g., Q8) is pulse-width modulated at a fifth frequency with a fifth duty cycle, the fourth frequency is substantially the same as the fifth frequency, and the fourth duty cycle has a different duration than the fifth duty cycle.

In some embodiments, the fourth switch (e.g., Q7) and a sixth switch (e.g., Q6) of the second switch circuit are configured to be simultaneously active during another part of the first portion of the discharging mode.

In some embodiments, a switch (e.g., Q2) of the first switch circuit is configured to be opened during a duration of the first portion of the charging mode.

In some embodiments, a switch (e.g., Q5) of the second switch circuit is configured to be opened during a duration of the first portion of the discharging mode.

In some embodiments, the first switch circuit includes a first switch (e.g., Q1) having a first terminal coupled to a first terminal of an input port and a second terminal coupled to a first terminal of a first winding of the transformer, a second switch (e.g., Q2) having a first terminal coupled to the first terminal of the input port and a second terminal coupled to a second terminal of the first winding of the transformer, a third switch (e.g., Q3) having a first terminal coupled to the first terminal of the first winding of the transformer and a second terminal coupled to a second terminal of the input port, and a fourth switch (e.g., Q4) having a first terminal coupled to the second terminal of the first winding of the transformer and a second terminal coupled the second terminal of the input port.

In some embodiments, the first switch circuit includes a fifth switch (e.g., Q5) having a first terminal coupled to a first terminal of an output port and a second terminal coupled to a first terminal of a second winding of the transformer, a sixth switch (e.g., Q6) having a first terminal coupled to the first terminal of the output port and a second terminal coupled to a second terminal of the second winding of the transformer, a seventh switch (e.g., Q7) having a first terminal coupled to the first terminal of the second winding of the transformer and a second terminal coupled to a second terminal of the output port, and an eighth switch (e.g., Q8) having a first terminal coupled to the second terminal of the second winding of the transformer and a second terminal coupled the second terminal of the output port.

Pursuant to some embodiments of the present invention, a bidirectional power converter includes a first switch circuit coupled to a second switch circuit via a transformer, where the first switch circuit is configured to transfer power to the second switch circuit during a charging mode, the second switch circuit is configured to transfer power to the first switch circuit during a discharging mode, and a first switch (e.g., Q2) of the first switch circuit is configured to be opened during a majority of a duration of the charging mode.

In some embodiments, a first switch (e.g., Q5) of the second switch circuit is configured to be opened during the duration of the discharging mode.

In some embodiments, a second switch (e.g., Q4) of the first switch circuit is configured to be operated so as to be active during a portion of a duty cycle of a third switch (e.g., Q3) of the first switch circuit.

In some embodiments, a second switch (e.g., Q4) of the first switch circuit is configured to be operated so as to be active during a portion of a duty cycle of a third switch (e.g., Q3) and a fourth switch (e.g., Q1) of the first switch circuit.

In some embodiments, a second switch (e.g., Q7) of the second switch circuit is configured to be operated so as to be active during a portion of a duty cycle of a third switch (e.g., Q8) of the second switch circuit.

In some embodiments, a second switch (e.g., Q7) of the second switch circuit is configured to be operated so as to be active during a portion of a duty cycle of a third switch (e.g., Q8) and a fourth switch (e.g., Q6) of the second switch circuit.

In some embodiments, the first switch circuit comprises a first full-bridge switch circuit, and the second switch circuit comprises a second full-bridge switch circuit.

In some embodiments, the first switch (e.g., Q2) of the first switch circuit is configured to be opened during the entirety of the duration of the charging mode.

Pursuant to some embodiments of the present invention, a bidirectional power converter includes a first switch circuit coupled to a second switch circuit via a transformer, where the first switch circuit comprises a first switch (e.g., Q1), a second switch (e.g., Q2), a third switch (e.g., Q3), and a fourth switch (e.g., Q4) and is configured to transfer power to the second switch circuit during a charging mode, the second switch circuit comprises a fifth switch (e.g., Q5), a sixth switch (e.g., Q6), a seventh switch (e.g., Q7), and an eighth switch (e.g., Q8) and is configured to transfer power to the first switch circuit during a discharging mode, the third switch (e.g., Q3) and the fourth switch (e.g., Q4) are configured to be simultaneously active during a portion of the charging mode, the fourth switch (e.g., Q4) and the third switch (e.g., Q3) are configured to be controlled by respective pulse width modulation (PWM) signals, and a first PWM signal of the fourth switch (e.g., Q4) has a pulse width of a different duration than a second PWM signal of the third switch (e.g., Q3).

In some embodiments, the first switch circuit is configured to operate as a full bridge synchronous rectifier during the portion of the discharging mode.

In some embodiments, the second switch circuit is configured to operate as a full bridge synchronous rectifier during the portion of the charging mode.

In some embodiments, the fourth switch (e.g., Q4) is configured to transition from a deactivation state to an activation state at substantially the same time that the third switch (e.g., Q3) is configured to transition from a deactivation state to an activation state.

In some embodiments, the fourth switch (e.g., Q4) is configured to transition from an activation state to a deactivation state at substantially the same time that the third switch (e.g., Q3) is configured to transition from an activation state to a deactivation state.

In some embodiments, the fourth switch (e.g., Q4) is pulse-width modulated at a first frequency and the third switch (e.g., Q3) is pulse-width modulated at a second frequency, and the first frequency is substantially the same as the second frequency.

In some embodiments, the fourth switch (e.g., Q4) and the first switch (e.g., Q1) of the first switch circuit are configured to be simultaneously active during another portion of the charging mode.

In some embodiments, the seventh switch (e.g., Q7) and the eighth switch (e.g., Q8) of the second switch circuit are configured to be simultaneously active during a portion of the discharging mode.

In some embodiments, the seventh switch (e.g., Q7) is configured to transition from a deactivation state to an activation state at substantially the same time that the eighth switch (e.g., Q8) is configured to transition from a deactivation state to an activation state.

In some embodiments, the seventh switch (e.g., Q7) is configured to transition from an activation state to a deactivation state at substantially the same time that the eighth switch (e.g., Q8) is configured to transition from an activation state to a deactivation state.

In some embodiments, the seventh switch (e.g., Q7) is pulse-width modulated at a fourth frequency with a fourth duty cycle and the eighth switch (e.g., Q8) is pulse-width modulated at a fifth frequency with a fifth duty cycle, the fourth frequency is substantially the same as the fifth frequency, and the fourth duty cycle has a different duration than the fifth duty cycle.

In some embodiments, the seventh switch (e.g., Q7) and the sixth switch (e.g., Q6) of the second switch circuit are configured to be simultaneously active another portion of the discharging mode.

In some embodiments, the second switch (e.g., Q2) of the first switch circuit is configured to be opened during the duration of the charging mode.

In some embodiments, the fifth switch (e.g., Q5) of the second switch circuit is configured to be opened during the duration of the discharging mode.

In some embodiments, the second switch (e.g., Q2) of the first switch circuit is configured to be controlled by a third PWM signal during the charging mode such that the second switch (e.g., Q2) is activated when the fourth switch (e.g., Q4) is inactive.

In some embodiments, wherein the fifth switch (e.g., Q5) of the second switch circuit is configured to be controlled by a fourth PWM signal during the discharging mode such that fifth switch (e.g., Q5) is activated when the seventh switch (e.g., Q7) is inactive.

Pursuant to some embodiments of the present invention, a method of operating a bidirectional power converter includes providing a first switch circuit having a full bridge configuration that is coupled to a second switch circuit through a transformer, operating the first switch circuit having the full bridge configuration of the bidirectional power converter in a half bridge configuration during a first portion of a charging mode, and transferring power through the transformer from the first switch circuit to the second switch circuit during the charging mode.

In some embodiments, the method further includes operating the second switch circuit to transfer power to the first switch circuit during a discharging mode of the bidirectional power converter.

In some embodiments, the method further includes operating the first switch circuit to operate in a full bridge synchronous rectifier configuration during a first portion of the discharging mode.

In some embodiments, the method further includes operating the second switch circuit to operate as a full bridge synchronous rectifier during the first portion of the charging mode.

In some embodiments, operating the first switch circuit during the first portion of the charging mode comprises operating a first switch (e.g., Q4) and a second switch (e.g., Q3) of the first switch circuit to be simultaneously active during part of the first portion of the charging mode.

In some embodiments, operating the first switch circuit during the first portion of the charging mode further comprises operating the first switch (e.g., Q4) to transition from a deactivation state to an activation state at substantially the same time that the second switch (e.g., Q3) transitions from a deactivation state to an activation state during the first portion of the charging mode.

In some embodiments, operating the first switch circuit during the first portion of the charging mode further comprises operating the first switch (e.g., Q4) to transition from an activation state to a deactivation state at substantially the same time that the second switch (e.g., Q3) transitions from an activation state to a deactivation state during the first portion of the charging mode.

In some embodiments, operating the first switch circuit during the first portion of the charging mode further comprises operating the first switch (e.g., Q4) and a third switch (e.g., Q1) of the first switch circuit to be simultaneously active during another part of the first portion of the charging mode.

In some embodiments, operating the first switch circuit during the first portion of the charging mode further comprises operating a switch (e.g., Q2) of the first switch circuit to be opened during a duration of the first portion of the charging mode.

Further features, advantages, and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying figures are included to provide a further understanding of the present invention, and are incorporated in and constitute a part of this specification. The drawings illustrate some embodiments of the present invention and, together with the description, serve to explain principles of the present invention.

DETAILED DESCRIPTION

Figure 1:
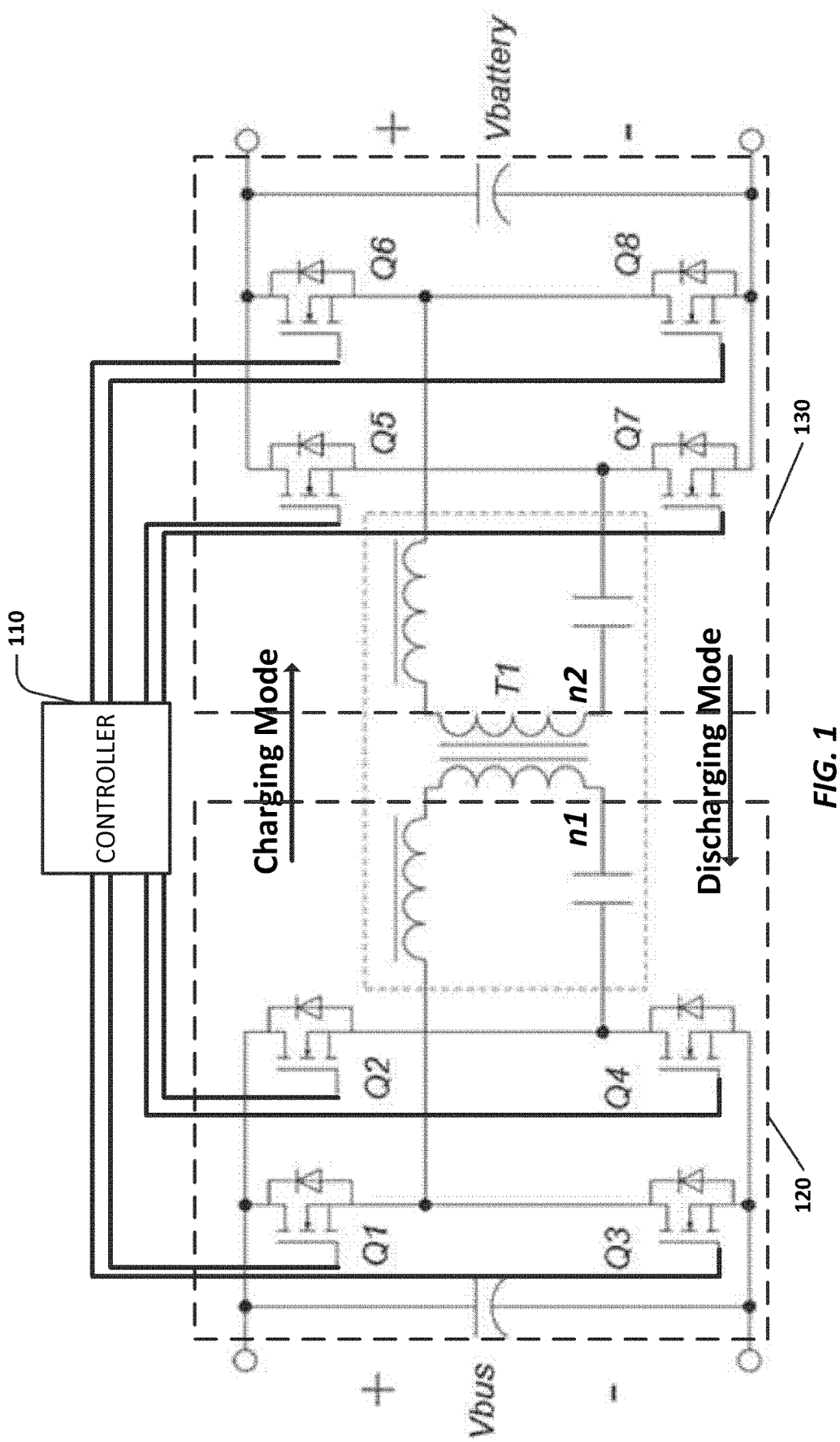
FIG. 1 is a circuit diagram that illustrates a bidirectional CLLC converter, including a controller configured to control operations of the circuit, according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

Pursuant to embodiments of the present invention, bidirectional CLLC converters are provided that are configured to be driven such that a first switch circuit of the bidirectional CLLC converter is configured to operate in a half bridge configuration during at least a portion of the charging mode and in a full bridge configuration during at least a portion of the discharging mode so as to increase a range of the gain of the system while reducing and/or minimizing switching losses. In some embodiments, duty cycles and/or frequencies of switches in the bidirectional CLLC converter may be manipulated to provide concurrent activation times for one or more of the switches so as to provide ZVS for the switches during charging and/or discharging operation.

FIG. 1 illustrates a bidirectional CLLC converter according to some embodiments of the present invention. Designs of bidirectional CLLC converters are discussed, for example, in Jee-Hoon Jung et al., "Design Methodology of Bidirectional CLLC Resonant Converter for High-Frequency Isolation of DC Distribution Systems," IEEE Transactions on Power Electronics, Apr. 2013, Vol. 28, No. 4, the contents of which are incorporated herein by reference. Operation of the bidirectional CLLC converter are determined, in part, based on control of various switching elements (e.g., switches Q1, Q2, Q3, Q4, Q5, Q6, Q7, and Q8) that are controlled by controller 110. Controller 110 (e.g., a digital controller) may be coupled to the switches Q1, Q2, Q3, Q4, Q5, Q6, Q7, and Q8 and may provide signals for activating the switches Q1, Q2, Q3, Q4, Q5, Q6, Q7, and Q8.

The switches Q1, Q2, Q3, Q4, Q5, Q6, Q7, and Q8 are illustrated as a MOSFET transistor switches in FIG. 1. However, it will be appreciated that other types of switches, for example bipolar junction transistors (BJTs), junction field effect transistors (JFETs), thyristors and/or other devices, can be used instead of, or in addition to, MOSFET switches. In the discussion herein, switches Q1, Q2, Q3, Q4, Q5, Q6, Q7, and Q8 are described as being "activated/active" and "inactivated/inactive." As used herein, activating the switches Q1, Q2, Q3, Q4, Q5, Q6, Q7, and Q8 refers to turning the switches Q1, Q2, Q3, Q4, Q5, Q6, Q7, and Q8 on. Similarly, deactivating the switches Q1, Q2, Q3, Q4, Q5, Q6, Q7, and Q8 refers to turning the switches Q1, Q2, Q3, Q4, Q5, Q6, Q7, and Q8 off. It will be understood that the switches Q1, Q2, Q3, Q4, Q5, Q6, Q7, and Q8 may be implemented as normally-on or normally-off devices without deviating from the present invention.

Each of the switches Q1, Q2, Q3, Q4, Q5, Q6, Q7, and Q8 are illustrated in FIG. 1 as being in parallel with a diode. This diode may be an explicit external diode in the circuit and/or the diode may be the implicit internal body diode of the switch Q1, Q2, Q3, Q4, Q5, Q6, Q7, and Q8. The "body diode" of a MOSFET is the P-N junction between the drain terminal and the substrate. The internal body diode may pass current whenever the source is more positive than the drain (in an N-channel MOSFET) because there is a direct connection between the source terminal and the substrate as well.

The bidirectional full-bridge CLLC resonant converter illustrated in FIG. 1 has a primary inverting stage 120 with a full-bridge symmetric structure of the primary inverting stage 120 coupled to a secondary rectifying stage 130 by a symmetric high-frequency transformer Ti. During a charging mode, power switches Q1, Q2, Q3, Q4 in the primary inverting stage 120 convert input power (a voltage signal of which is represented by Vbus) from DC to AC to transfer the power to the secondary rectifying stage 130 through the transformer Ti during a charging mode of the device. The converter can then output the power, a voltage signal of which is represented by Vbattery) Using this transformer Ti, the converter can achieve galvanic isolation between the primary stage 120 and the secondary stage 130. During a discharging mode, the operation of the circuit reverses. Namely, the power switches Q5, Q6, Q7, Q8 in the secondary stage 130 convert input power (a voltage signal of which is represented by Vbattery) from DC to AC to transfer the power to the primary stage 120 through the transformer Ti.

In a conventional bidirectional full-bridge CLLC resonant converter, the device is controlled such that the primary side acts as a full-bridge converter while the secondary side acts as a synchronous rectifier during the charging mode, and the secondary side acts as a full-bridge converter while the primary side acts as a synchronous rectifier during the discharging mode. Embodiments of the present invention propose modifying the control of the device (e.g., via controller 110) to alter the operation of the switches from that utilized by a conventional bidirectional full-bridge CLLC resonant converter. The bidirectional CLLC resonant converters according to embodiments of the present invention operating in a different manner to provide improved performance.

In the conventional control scheme, the controller may set the duty cycle of switches Q1, Q2, Q3, and Q4 at about 50% and may adjust the switching frequency to adjust the voltage gain of the CLLC converter during the charging mode. As used herein, the duty cycle of a switch refers to the duty cycle of a signal provided to activate the switch. For example, the switch may be a transistor and the signal provided to activate the switch may be a power signal having a voltage or current that is applied to the gate (or base) of the transistor. In some embodiments, the signal applied to the switch may be a pulse width modulated signal, and the duty cycle refers to the duty cycle of the pulses of the signal. Similarly, the frequency of the pulses of the signal may be used to adjust the switching frequency of the switch.

The gain of the bidirectional CLLC converter (e.g., the increase in power from the input to the output) in the charging mode may be adjustable based on a number of operational factors, including, but not limited to, the turn ratio of the transformer Ti, the switching frequency, the resonant frequency of the circuit, the ratio between the resonant inductance and the magnetizing inductance, etc. For example, the gain of the bidirectional CLLC converter may be one value at a switching frequency of the switches of the primary stage 120, but may be another value at a second switching frequency. Thus, the gain of the bidirectional CLLC converter may be changed based on a number of factors that may be adjusted. In general, a range of the factors that may be adjusted to adjust the gain of the circuit may extend from a lower bound and/or value, represented by a, up to a higher bound and/or value, represented by b (where a<b).

The switching frequency of switches Q5, Q6, Q7, and Q8 may be adjusted to control the voltage gain in discharging mode. As in the charging mode, the gain of the CLLC converter may also be adjustable in discharging mode. The adjustable factor of the circuit in the discharging mode may range from c to d (where c<d).

The turn ratio of the transformer T1 may be represented by the number of turns of the primary winding over the number of turns on the secondary winding: nl/n2. Thus, the available Vbattery range in charging mode (e.g., the output voltage signal in charging mode) is shown Eqn. 1, and the available Vbus voltage range in discharging mode (e.g., the output voltage signal in discharging mode) is shown Eqn. 2.

$$\frac{a \cdot Vbus \cdot n2}{n1} < Vbattery < \frac{b \cdot Vbus \cdot n2}{n1} \qquad \text{(Eqn. 1)}$$

$$\frac{c \cdot Vbattery \cdot n1}{n2} < Vbus < \frac{d \cdot Vbattery \cdot n1}{n2} \qquad \text{(Eqn. 2)}$$

In embodiments of the present invention, a duty cycle and switching frequency of switches Q1 and Q3 may be adjusted to adjust the voltage gain of the CLLC converter in the charging mode. In some embodiments, the duty cycle of switches Q1 and Q3 may be set at about 50%. The duty cycle of switch Q2 can also be set at zero (e.g., always off during the charging mode) while the duty cycle of switch Q4 may be set at 100% (e.g., always on during the charging mode). Then the primary side of the CLLC converter can operate as half bridge CLLC with the secondary side of the CLLC converter operating as a full bridge synchronous rectifier during the charging mode as shown in FIG. 2.

Figure 2:
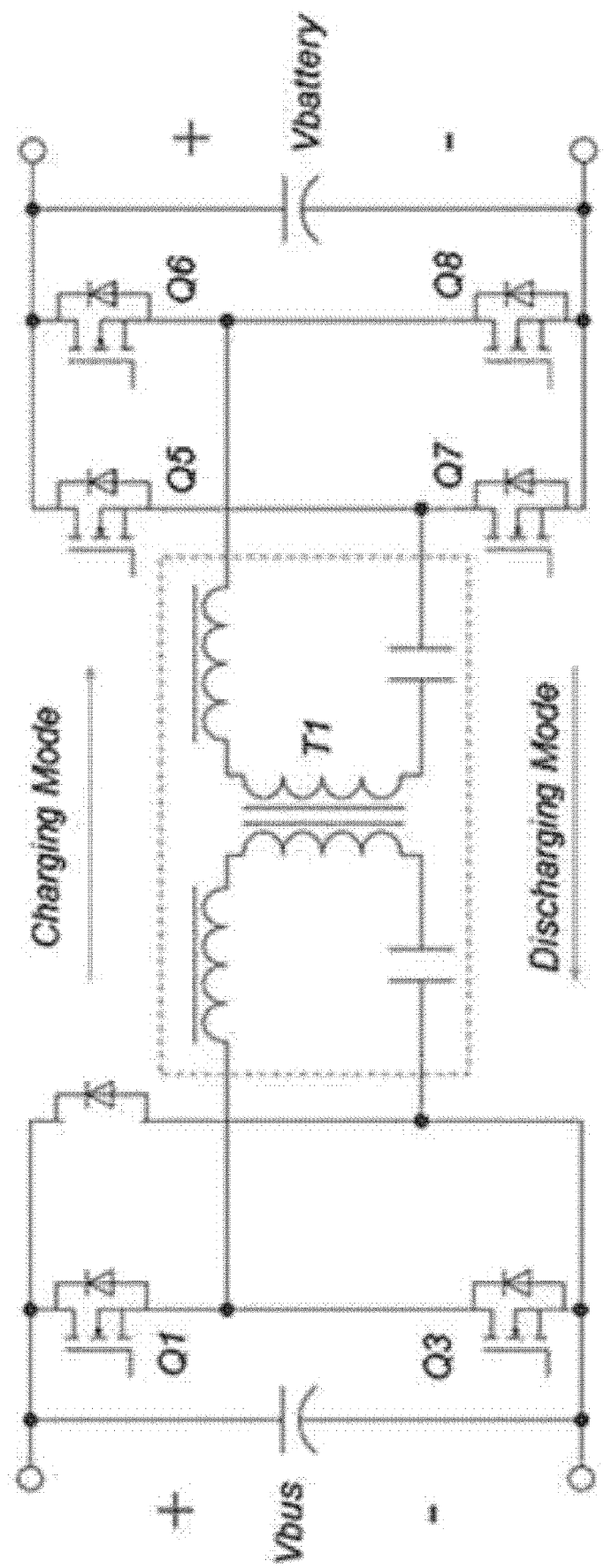
FIG. 2 is a circuit diagram that illustrates how the bidirectional CLLC converter of FIG. 1 may operate as a half bridge CLLC converter with full bridge synchronous rectification in charging mode, according to some embodiments of the present invention.

In the configuration illustrated in FIG. 2, the available Vbattery range in charging mode is shown by Eqn. 3.

$$\frac{0.5a \cdot Vbus \cdot n2}{n1} < Vbattery < \frac{b \cdot Vbus \cdot n2}{n1} \qquad \text{(Eqn. 3)}$$

As illustrated in Eqn. 3, the revised configuration has decreased the lower range of the gain of Vbattery in the charging mode.

Figure 3:
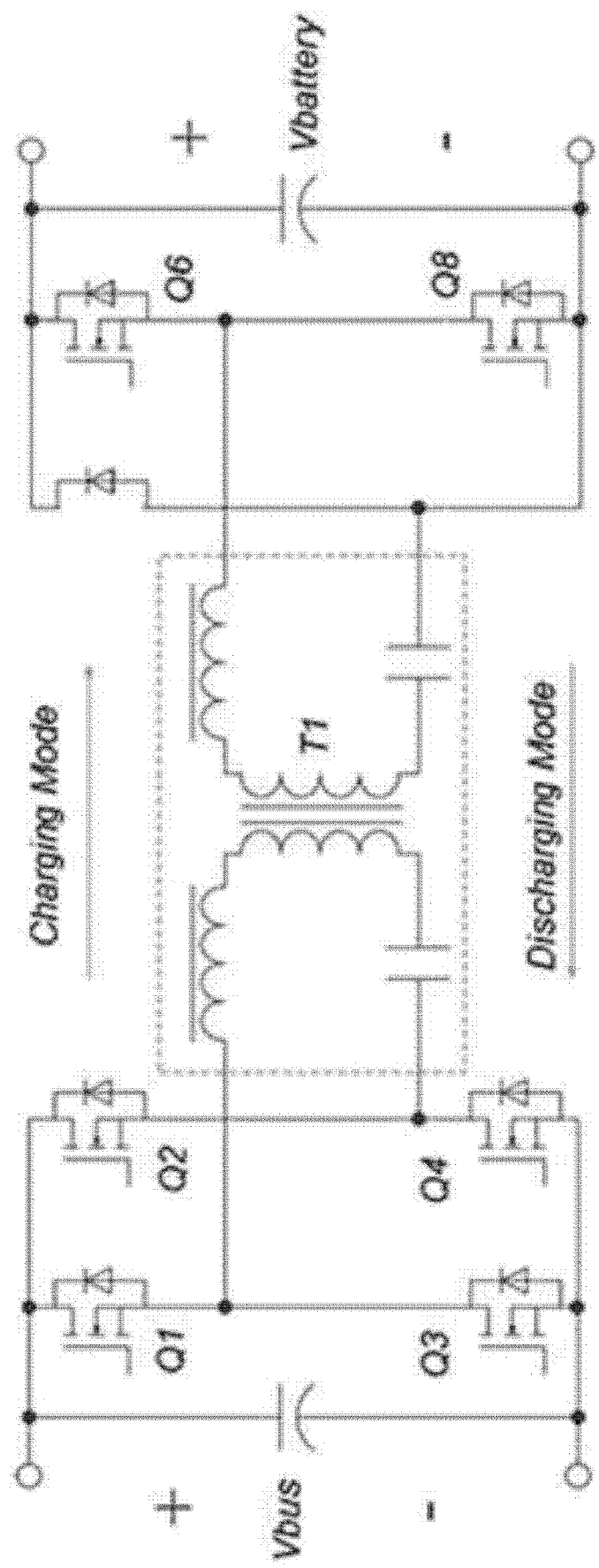
FIG. 3 is a circuit diagram that illustrates how the bidirectional CLLC converter of FIG. 1 may operate as a half bridge CLLC converter with full bridge synchronous rectification in discharging mode, according to some embodiments of the present invention.

Similarly, in embodiments of the present invention, a duty cycle and switching frequency of switches Q6 and Q8 may be adjusted to adjust the voltage gain of the CLLC converter in the discharging mode. In some embodiments, the duty cycle of switches Q6 and Q8 may be set at about 50%. The duty cycle of switch Q5 may also be set at zero (e.g., always off during the discharging mode) while the duty cycle of switch Q7 may be set at 100% (e.g., always on during the discharging mode). Then the CLLC converter can operate as a half bridge CLLC converter with full bridge synchronous rectifiers in the discharging mode as shown in FIG. 3.

The available Vbus voltage range in discharging mode is shown by Eqn. 4.

$$\frac{0.5c \cdot Vbattery \cdot n1}{n2} < Vbus < \frac{d \cdot Vbattery \cdot n1}{n2} \qquad \text{(Eqn. 4)}$$

As illustrated in Eqn. 4, the revised configuration has decreased the lower range of the gain of Vbus in the discharging mode.

Figure 4:
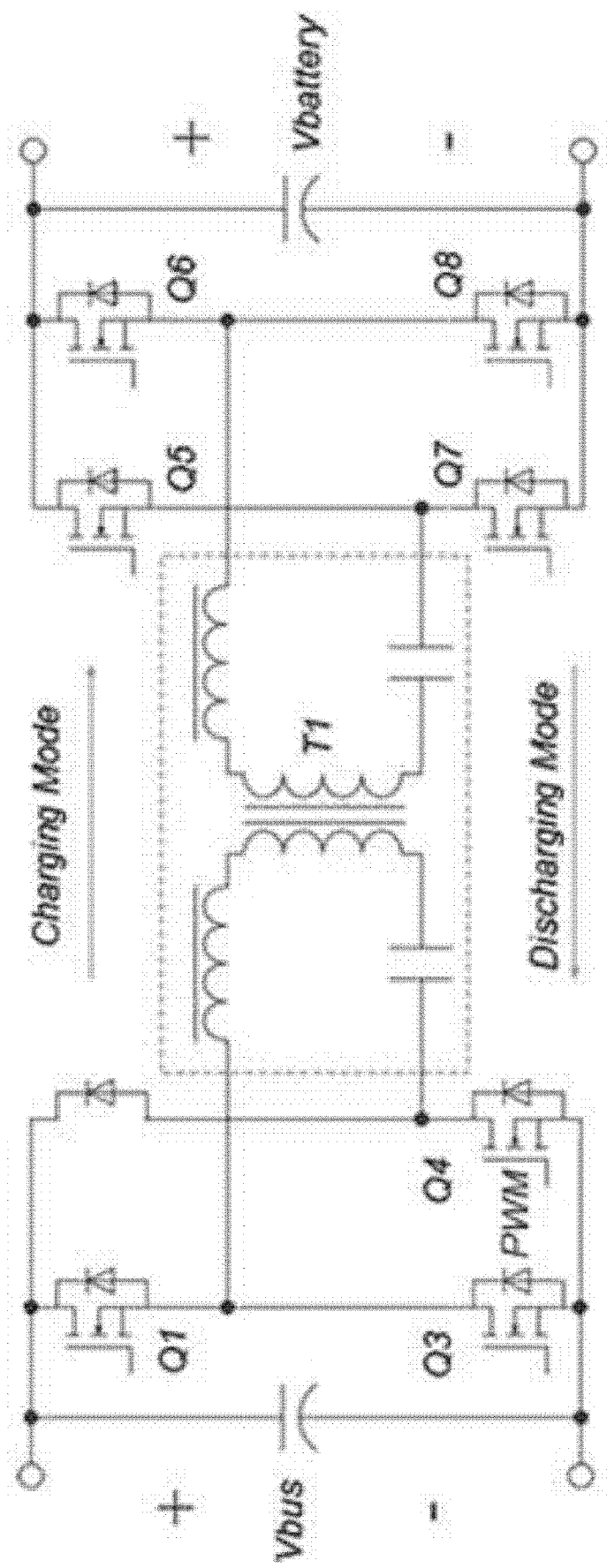
FIG. 4 is a circuit diagram that illustrates a signal that is applied to control a switch of the bidirectional CLLC converter according to some embodiments of the present invention when operating in the charging mode.
Figure 5:
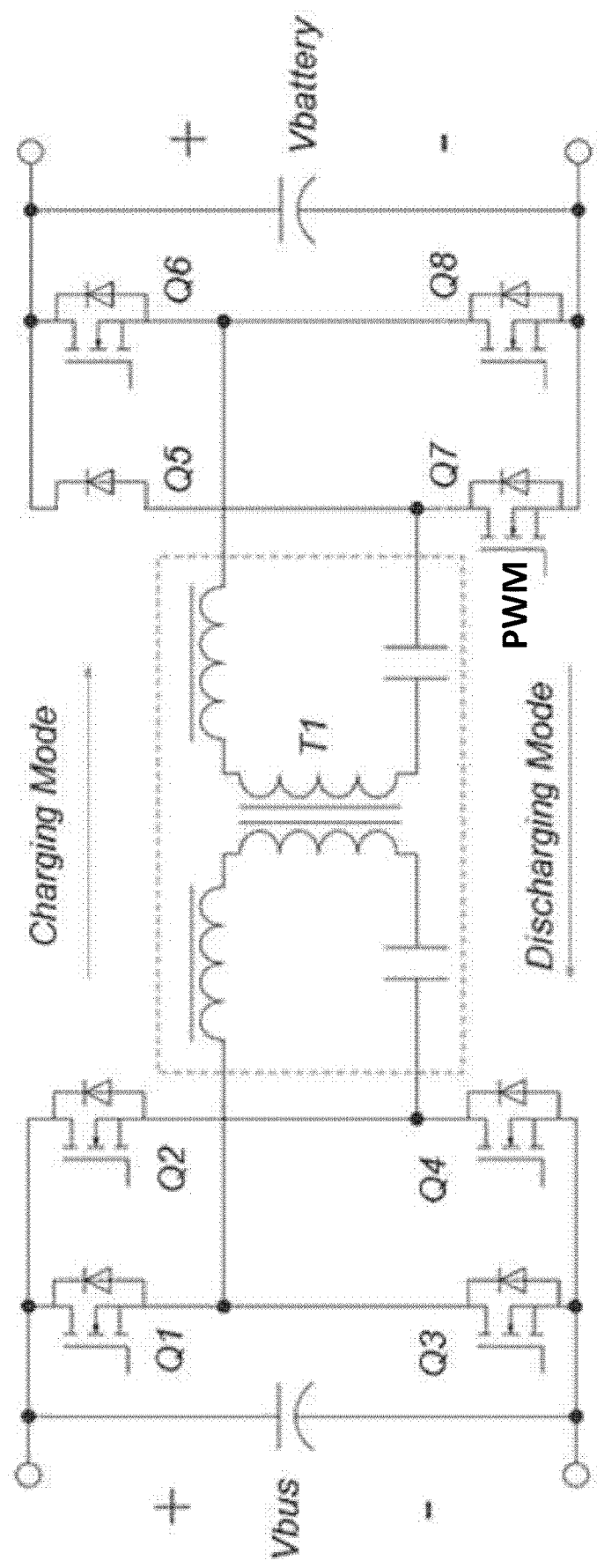
FIG. 5 is a circuit diagram that illustrates a signal that is applied to control a switch of the bidirectional CLLC converter according to some embodiments of the present invention when operating in the discharging mode.

In some embodiments, the controller 110 (e.g., a digital controller) may adjust the duty cycle and phase shift (e.g., as compared to the signals provided to the other switches Q1, Q3) of a signal provided to activate switch Q4 in the charging mode or a signal provided to activate switch Q7 in the discharging mode (see FIG. 5) to further reduce the gain of the CLLC converter. For example, as illustrated in FIG. 4, a pulse-width modulated (PWM) signal may be applied to a control of switch Q4 during the charging mode. Similarly, as illustrated in FIG. 5, a pulse-width modulated (PWM) signal may be applied to a control of switch Q7 during the discharging mode. In some embodiments the PWM signal may be applied to a gate of a MOSFET. Though FIGS. 4 and 5 each illustrate a PWM signal applied to a single switch, it will be understood that each of the switches Q1, Q2, Q3, Q4, Q5, Q6, Q7, and Q8 may be coupled to a signal controlling its activation (also shown in FIG. 1). Thus, the controller 110 may be configured to collectively control the activation and deactivation (e.g., via a pulse width modulated signal) of the switches Q1, Q2, Q3, Q4, Q5, Q6, Q7, and Q8.

Figure 6:
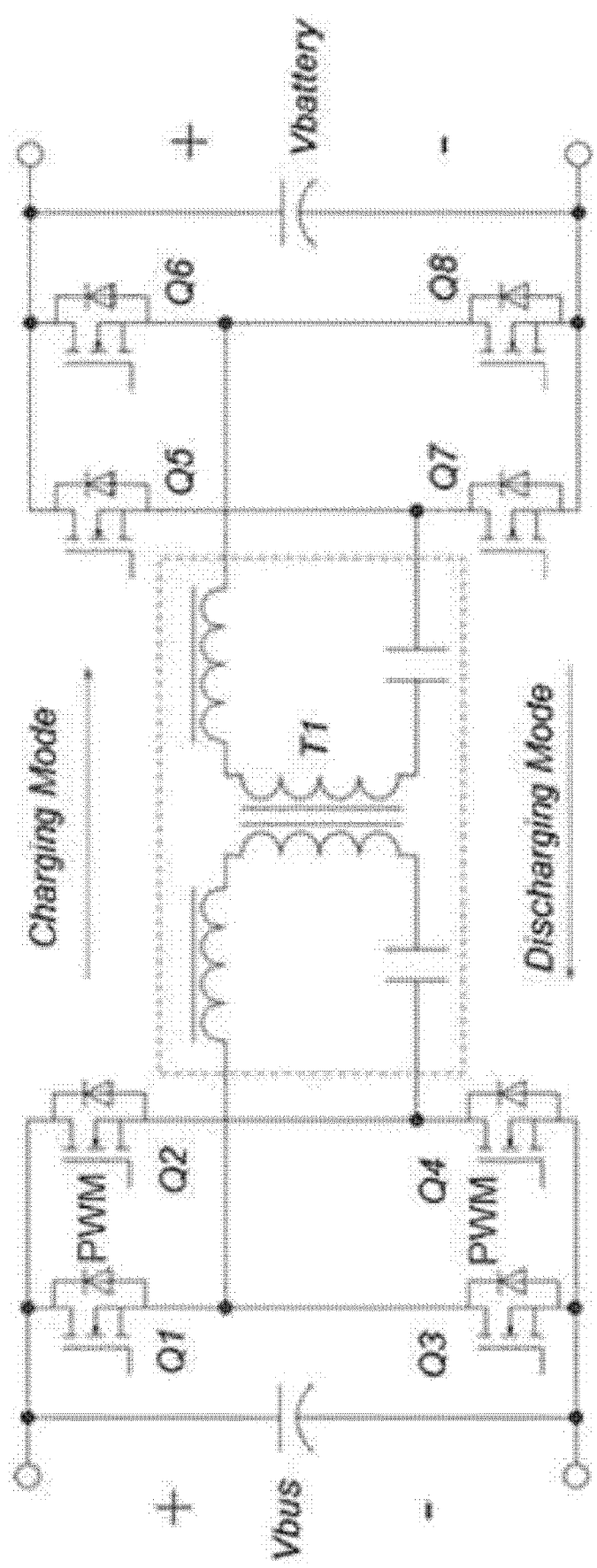
FIG. 6 is a circuit diagram that illustrates additional embodiments of the bidirectional CLLC converter according to some embodiments of the present invention when operating in the charging mode.
Figure 7:
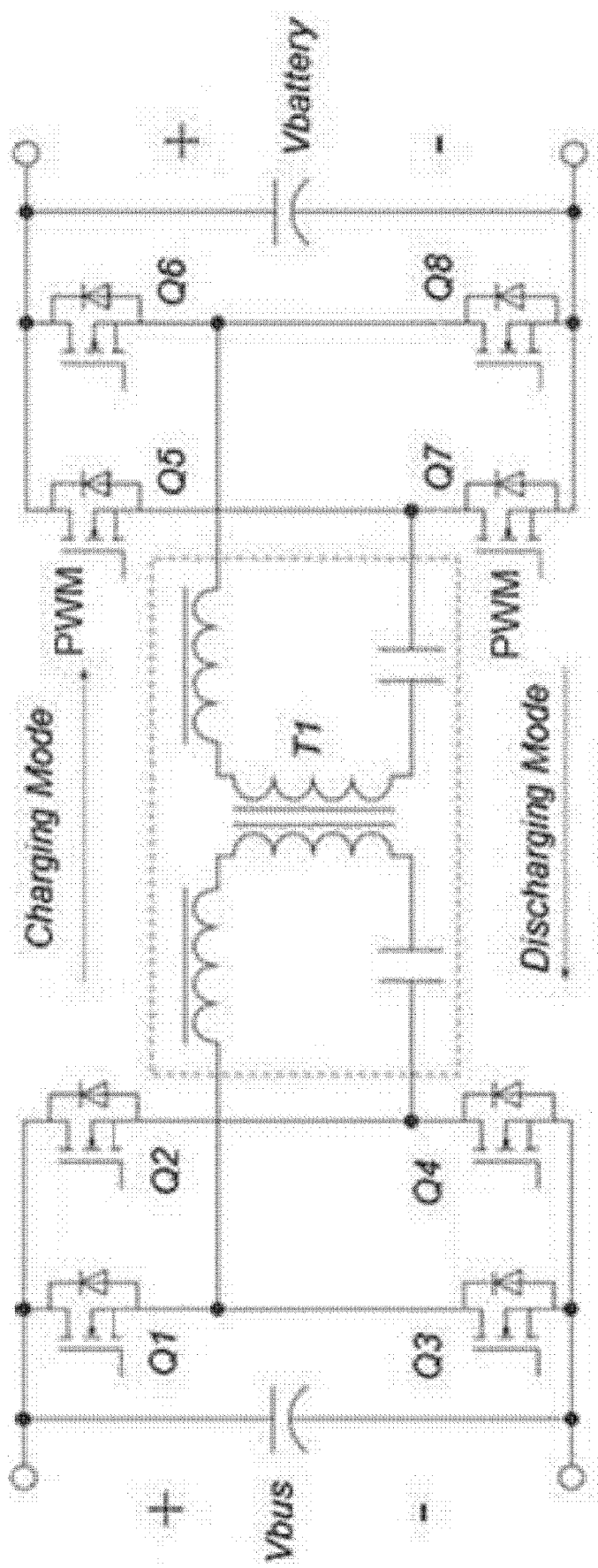
FIG. 7 is a circuit diagram that illustrates additional embodiments of the bidirectional CLLC converter according to some embodiments of the present invention when operating in the discharging mode.

In FIGS. 4 and 5, one switch was left inactive for the duration of the charging mode and another switch was left inactive for the duration of the discharging mode (e.g., switch Q2 in the charging mode and switch Q5 in the discharging mode. When switch Q4 is off, the current can be freewheeling via the internal body diode of switch Q2. In some embodiments, switch Q2 may be activated (e.g., turned on) during the freewheeling mode, so as to minimize the conduction loss on the internal body diode of switches Q2 (during charging mode) and Q5 (during discharging mode). FIGS. 6 and 7 illustrate embodiments in which switch Q2 (in charging mode) and switch Q5 (in discharging mode) are activated (e.g., turned on) so as to reduce and/or minimize conduction losses of switches Q2 and Q5.

For example, as illustrated in FIG. 6, during the charging mode, switch Q2 may be activated in a complementary manner to switch Q4. That is to say that the duty cycle of switch Q2 may be opposite to that of switch Q4. As illustrated in FIG. 6, both switches Q2 and Q4 may be controlled via a PWM signal, though the PWM signal applied to Q2 may be different than the PWM signal applied to Q4. Thus, when switch Q4 is active (e.g., turned on), switch Q2 may be inactive (e.g., turned off) and when switch Q4 is inactive, switch Q2 may be active. In some embodiments, this will result in the duty cycle of switch Q2 being smaller/less than switch Q4.

Similarly, as illustrated in FIG. 7, during the discharging mode, switch Q5 may be activated in a complementary manner to switch Q7. That is to say that the duty cycle of switch Q5 may be opposite to that of switch Q7. As illustrated in FIG. 6, both switches Q5 and Q7 may be controlled via a PWM signal, though the PWM signal applied to Q5 may be different than the PWM signal applied to Q7. Thus, when switch Q7 is active (e.g., turned on), switch Q5 may be inactive (e.g., turned off) and when switch Q7 is inactive, switch Q5 may be active. In some embodiments, this will result in the duty cycle of switch Q5 being smaller/less than switch Q7. In the embodiments of FIGS. 6 and 7, ZVS may be achieved for switches Q2 and Q5, and a conduction loss of switches Q2 and Q5 can be reduced and/or minimized. As a result, the system efficiency of the bidirectional CLLC converter can be improved.

FIGS. 8A to 8H are timing diagrams that illustrate various operating modes of the bidirectional CLLC converter of FIG. 1 according to some embodiments of the present invention. In FIGS. 8A to 8H, the timing diagrams illustrate activation signals that may be applied to each of the switches Q1, Q2, Q3, Q4, Q5, Q6, Q7, and Q8 during the charging and discharging modes, respectively. In some embodiments, the signals may be signals applied to a gate of a transistor, such as a MOSFET, though the present invention is not limited thereto.

Figure 8A:
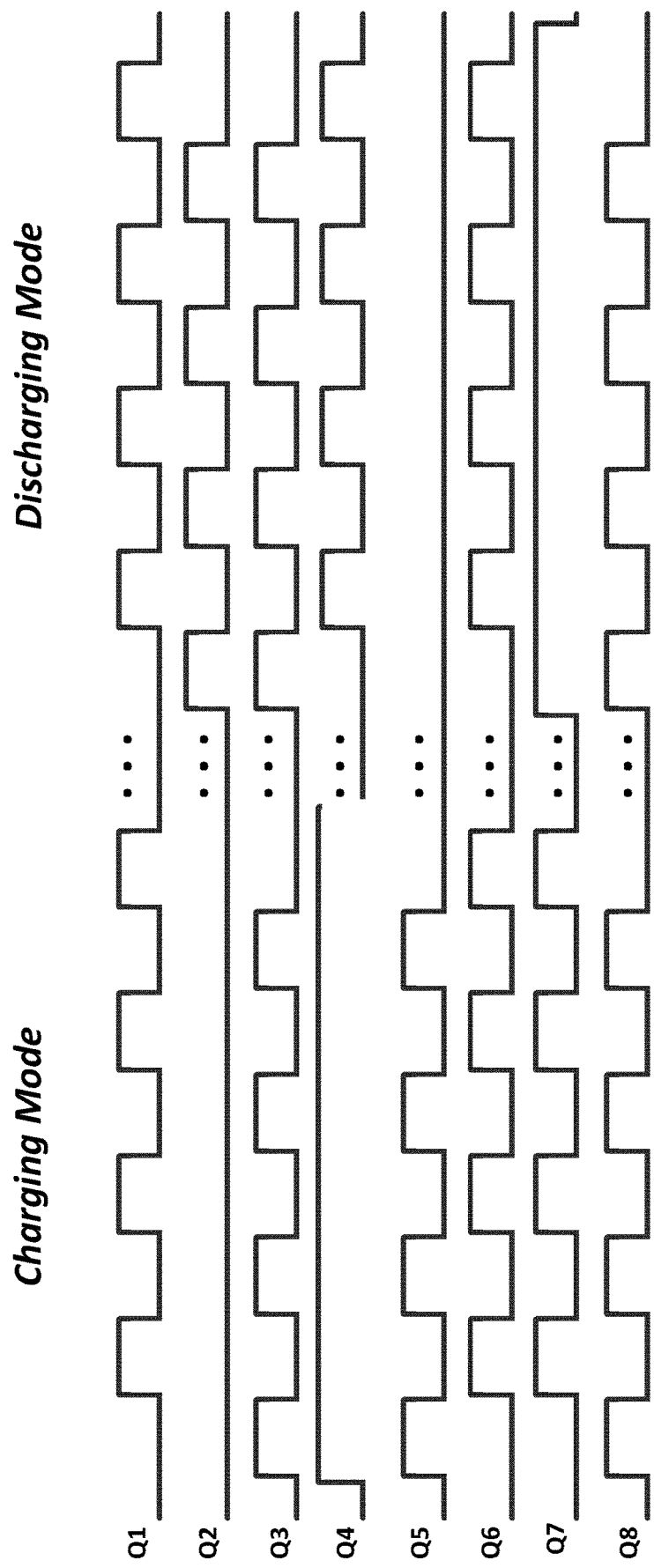
FIGS. 8A to 8H are timing diagrams that illustrate various operating modes of the bidirectional CLLC converter according to some embodiments of the present invention.

Referring to FIG. 8A and FIG. 1, an operating method of the present invention may include the deactivation of switch Q2 and the activation of switch Q4 for at least a majority of the charging mode. For example, during the charging mode, the switch Q2 may be biased so as to deactivate the switch Q2, and the switch Q4 may be biased so as to activate the switch Q4. In this embodiment, also illustrated in FIGS. 4 and 5 and discussed herein, the switches Q1 and Q3 may be activated during the charging mode according to respective pulse width modulated signals so as to operate as a half bridge CLLC (e.g., transferring power from the primary side of the transformer T1 to the secondary side). In some embodiments, a duty cycle of a signal provided to switches Q1 and Q3 may be approximately 50%.

In addition, during the charging mode, the switches Q5, Q6, Q7, and Q8 may be activated according to respective pulse width modulated signals so as to operate as a synchronous rectifier. The operation of the synchronous rectification of the secondary side is merely an example, and other signal patterns may be used to achieve the rectification without deviating from the present invention.

Still referring to FIG. 8A, in the discharging mode, the switch Q5 may be biased so as to deactivate the switch Q5, and the switch Q7 may be biased so as to activate the switch Q7 for at least a majority of the discharging mode. The switches Q6 and Q8 may be activated during the discharging mode according to respective pulse width modulated signals so as to operate as a half bridge CLLC (e.g., transferring power from the secondary side of the transformer T1 to the primary side). In some embodiments, a duty cycle of a signal provided to switches Q6 and Q8 may be approximately 50%.

In addition, during the discharging mode, the switches Q1, Q2, Q3, and Q4 may be activated according to respective pulse width modulated signals so as to operate as a synchronous rectifier. The operation of the synchronous rectification of the primary side is merely an example, and other signal patterns may be used to achieve the rectification without deviating from the present invention. As discussed herein with respect to Eqns. 3 and 4, the configuration of FIG. 8A may serve to reduce a lower range of the gain of the device.

In some embodiments, power may be transferred to the load in the charging mode (e.g., from the primary side to the secondary side, or from the left side of the circuit to the right side of the circuit in FIG. 8A). In some embodiments, the longer that switches Q1 and Q4 are simultaneously on, the higher the gain of the device in the charging direction. Similarly, power may be transferred in the discharging mode (e.g., from the secondary side to the primary side, or from the right side of the circuit to the left side of the circuit in FIG. 8A). In some embodiments, the longer that switches Q6 and Q7 are simultaneously on, the higher the gain of the device in the discharging direction.

Figure 8B:
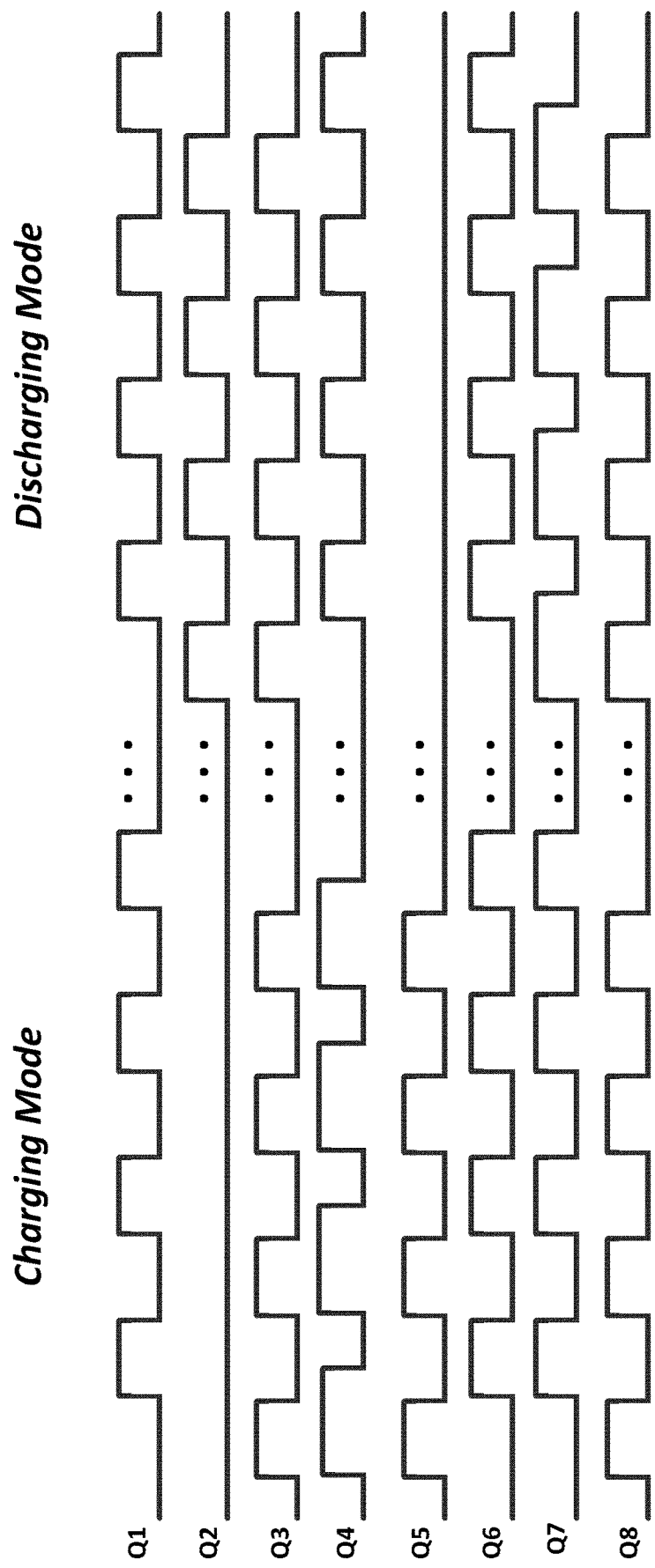

FIG. 8B is a timing diagram of an additional method for operating the bidirectional CLLC converter of FIG. 1 according to some embodiments the present invention. Referring to FIG. 8B and FIG. 1, an operating method of the present invention may include the deactivation of switch Q2 for at least a majority of the charging mode and the activation of switch Q4 according to a pulse-width modulated signal. For example, as illustrated in FIG. 8B, during at least a portion of the charging mode, the switch Q4 may be turned on (e.g., transition from a deactivated state to an activated state) at the same time as switch Q3. The switch Q4 may be activated by a signal (e.g., a PWM signal) having the same frequency as respective signals activating switches Q1 and Q3. In some embodiments, the PWM signal provided to switch Q4 may have a different duty cycle than a PWM signal provided to switch Q3. For example, the pulse width of the pulse modulated signal provided to switch Q4 may have a longer duration than the pulse width of the pulse modulated signal provided to switch Q3. In some embodiments, switch Q4 may be in an active state (e.g., simultaneously active) at a same time as switch Q3 for at least a portion of the charging mode. By adjusting the duty cycle of the switch Q4, the gain of the half bridge CLLC converter with full bridge synchronous rectification can be further adjusted, which may provide a wider range of gain for the device during the charging mode. The operating method of FIG. 8B may not achieve ZVS for switches Q1, Q3 and Q4.

The switches Q1 and Q3 may be activated during the charging mode according to respective pulse width modulated signals so as to transfer power from the primary side of the transformer T1 to the secondary side. In some embodiments, a duty cycle of a signal provided to switches Q1 and Q3 may be approximately 50%. In addition, during the charging mode, the switches Q5, Q6, Q7, and Q8 may be activated according to respective pulse width modulated signals so as to operate as a synchronous rectifier.

Still referring to FIG. 8B, in the discharging mode, the switch Q5 may be biased so as to deactivate the switch Q5 for at least a majority of the discharging mode, and the switch Q7 may be pulse-width modulated so as to turn on (e.g., transition from a deactivated state to an activated state) at a same time as switch Q8. The switch Q7 may be activated by a PWM signal having the same frequency as the signal that activates switch Q8. In some embodiments, the PWM signal provided to switch Q7 may have a different duty cycle than a PWM signal provided to switch Q8. For example, the pulse width of the pulse modulated signal provided to switch Q7 may have a longer duration than the pulse width of the pulse modulated signal provided to switch Q8. In some embodiments, switch Q7 may be in an active state (e.g., simultaneously active) at a same time as switch Q8 for at least a portion of the discharging mode. By adjusting the duty cycle of the switch Q7, the gain of the half bridge CLLC converter with full bridge synchronous rectification can be further adjusted during the discharging mode, which may provide a wider range of gain for the device. The operating method of FIG. 8B may not achieve ZVS for switches Q6, Q7, and Q8.

The switches Q6 and Q8 may be activated during the discharging mode according to respective pulse width modulated signals so as to transfer power from the secondary side of the transformer T1 to the primary side. In some embodiments, a duty cycle of a signal provided to switches Q6 and Q8 may be approximately 50%. In addition, during the discharging mode, the switches Q1, Q2, Q3, and Q4 may be activated according to respective pulse width modulated signals so as to operate as a synchronous rectifier.

Figure 8C:
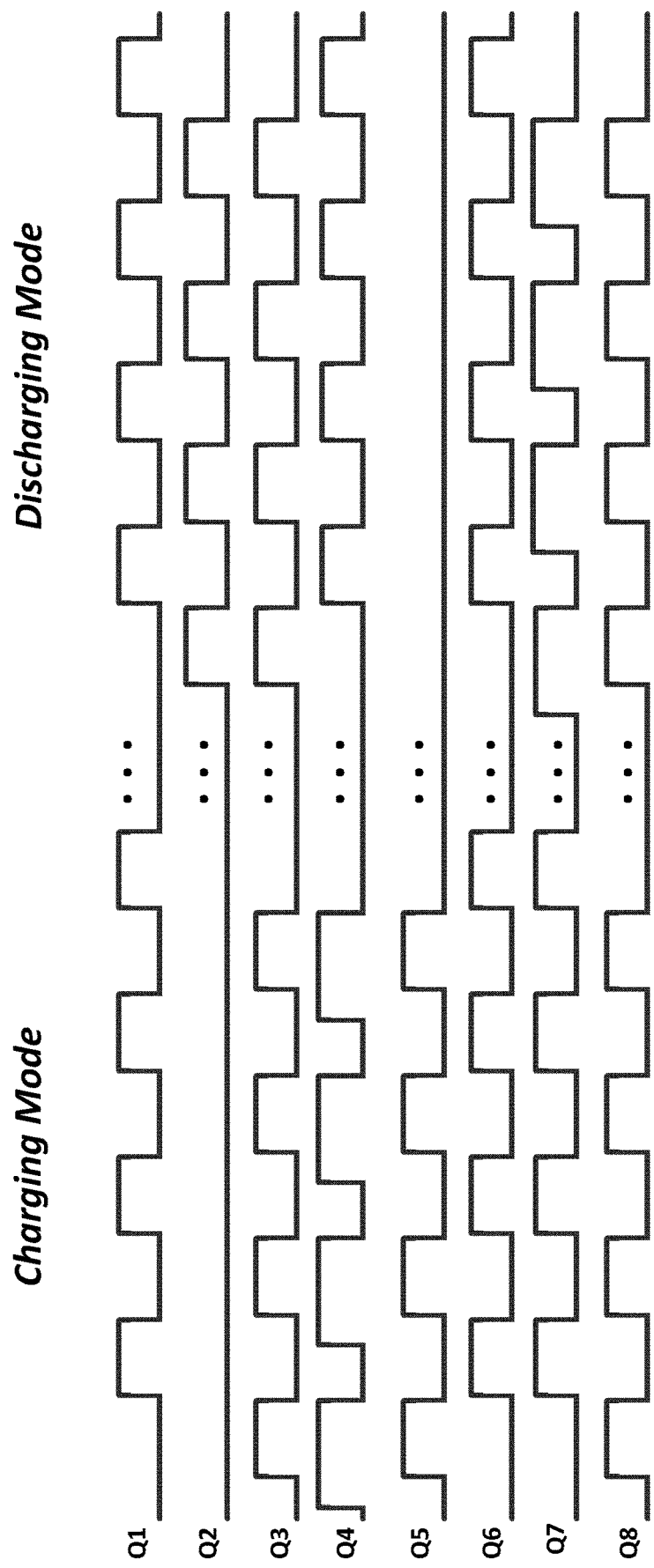

FIG. 8C is a timing diagram of an additional method for operating the bidirectional CLLC converter of FIG. 1 according to some embodiments the present invention. Referring to FIG. 8C and FIG. 1, an operating method of the present invention may include the deactivation of switch Q2 for at least a majority of the charging mode and the activation of switch Q4 according to a pulse-width modulated signal. For example, as illustrated in FIG. 8C, during at least a portion of the charging mode, the switch Q4 may be turned off (e.g., transition from an activated state to a deactivated state) at the same time as switch Q3. The switch Q4 may be activated by a signal (e.g., a PWM signal) having the same frequency as respective signals activating switches Q1 and Q3, but the PWM signal provided to switch Q4 may have a different duty cycle than a PWM signal provided to switch Q3. For example, the pulse width of the pulse modulated signal provided to switch Q4 may have a longer duration than the pulse width of the pulse modulated signal provided to switch Q3. In some embodiments, switch Q4 may be in an active state (e.g., simultaneously active) at a same time as switch Q3 for at least a portion of the charging mode. By adjusting the duty cycle of the switch Q4, the gain of the half bridge CLLC converter with full bridge synchronous rectification can be further adjusted during the charging mode. The operating method of FIG. 8C may achieve ZVS for switches Q1 and Q3, but ZVS for switch Q4 cannot be guaranteed.

The switches Q1 and Q3 may be activated during the charging mode according to respective pulse width modulated signals so as to transfer power from the primary side of the transformer Ti to the secondary side. In some embodiments, a duty cycle of a signal provided to switches Q1 and Q3 may be approximately 50%. In addition, during the charging mode, the switches Q5, Q6, Q7, and Q8 may be activated according to respective pulse width modulated signals so as to operate as a synchronous rectifier.

Still referring to FIG. 8C, in the discharging mode, the switch Q5 may be biased so as to deactivate the switch Q5 for at least a majority of the discharging mode, and the switch Q7 may be pulse-width modulated so as to turn off (e.g., transition from an activated state to a deactivated state) at a same time as switch Q8. The switch Q7 may be activated by a PWM signal having the same frequency as the signal activating switch Q8, but may have a different duty cycle than a PWM signal provided to switch Q8. For example, the pulse width of the pulse modulated signal provided to switch Q7 may have a longer duration than the pulse width of the pulse modulated signal provided to switch Q8. In some embodiments, switch Q7 may be in an active state (e.g., simultaneously active) at a same time as switch Q8 for at least a portion of the discharging mode. By adjusting the duty cycle of the switch Q7, the gain of the half bridge CLLC converter with full bridge synchronous rectification can be further adjusted during the discharging mode. The operating method of FIG. 8C may achieve ZVS for switches Q6 and Q8, but ZVS for switch Q7 cannot be guaranteed.

The switches Q6 and Q8 may be activated during the discharging mode according to respective pulse width modulated signals so as to transfer power from the secondary side of the transformer T1 to the primary side. In some embodiments, a duty cycle of a signal provided to switches Q6 and Q8 may be approximately 50%. In addition, during the discharging mode, the switches Q1, Q2, Q3, and Q4 may be activated according to respective pulse width modulated signals so as to operate as a synchronous rectifier.

Figure 8D:
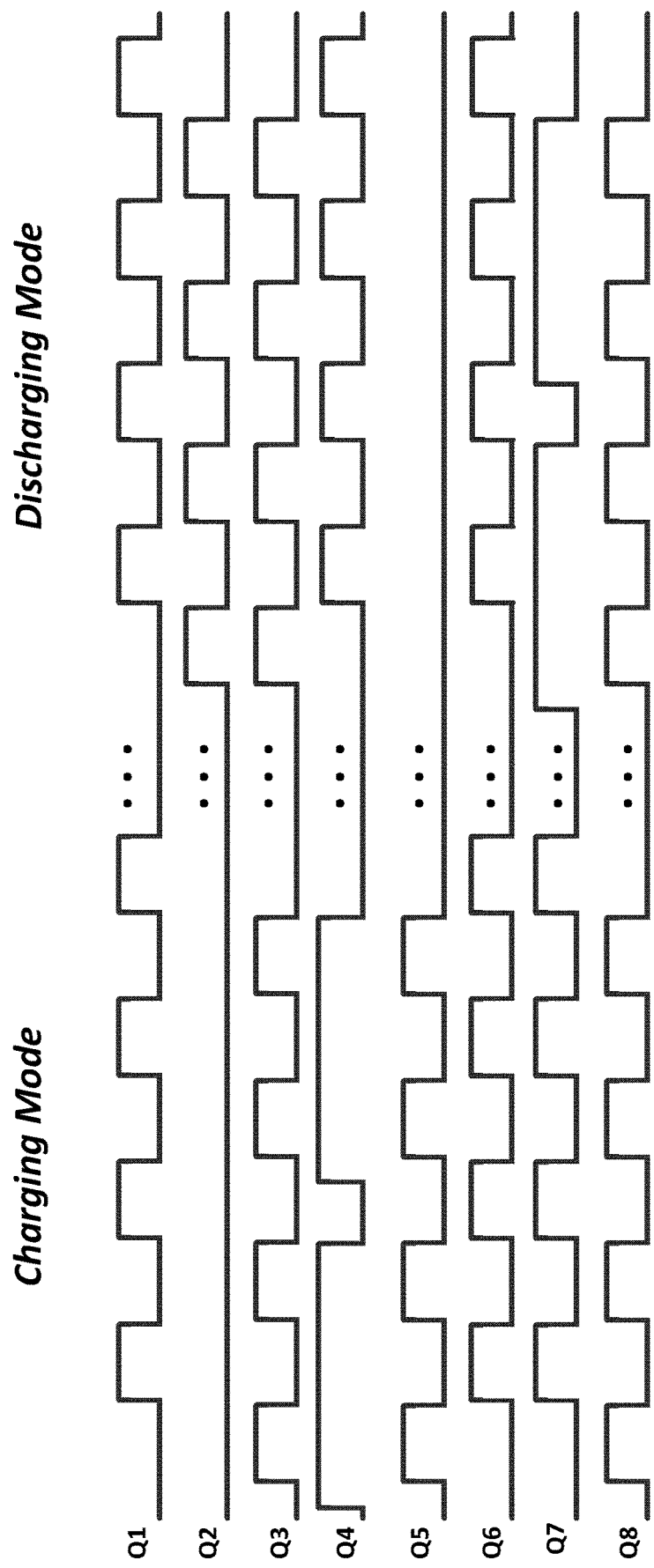

FIG. 8D is a timing diagram of an additional method for operating the bidirectional CLLC converter of FIG. 1 according to some embodiments the present invention. Referring to FIG. 8D and FIG. 1, an operating method of the present invention may include the deactivation of switch Q2 for at least a majority of the charging mode and the activation of switch Q4 according to a pulse-width modulated signal. For example, as illustrated in FIG. 8D, during at least a portion of the charging mode, the switch Q4 may be turned off (e.g., transition from an activated state to a deactivated state) at a same time as switch Q3. The switch Q4 may be activated by a signal (e.g., a PWM signal) having a different frequency as respective signals activating switches Q1 and Q3, and the PWM signal provided to switch Q4 may have a different duty cycle than a PWM signal provided to switch Q3. In some embodiments, the switching frequency of the signal provided to switch Q4 may be less than a switching frequency of respective signals provided to switches Q1 and Q3. For example, the pulse width of the pulse modulated signal provided to switch Q4 may have a longer duration than the pulse width of the pulse modulated signal provided to switch Q3. In some embodiments, switch Q4 may be in an active state (e.g., simultaneously active) at a same time as switch Q3 and at a same time as switch Q1 for at least a portion of the charging mode. By adjusting the duty cycle of the switch Q4, the gain of the half bridge CLLC converter with full bridge synchronous rectification can be further adjusted during the charging mode. The operating method of FIG. 8D may achieve ZVS for switches Q1 and Q3. In addition, since switch Q4 is pulse-width modulated at a lower switching frequency, the switching loss of switch Q4 can be reduced and/or minimized.

The switches Q1 and Q3 may be activated during the charging mode according to respective pulse width modulated signals so as to transfer power from the primary side of the transformer T1 to the secondary side. In some embodiments, a duty cycle of a signal provided to switches Q1 and Q3 may be approximately 50%. In addition, during the charging mode, the switches Q5, Q6, Q7, and Q8 may be activated according to respective pulse width modulated signals so as to operate as a synchronous rectifier.

Still referring to FIG. 8D, in the discharging mode, the switch Q5 may be biased so as to deactivate the switch Q5 for at least a majority of the discharging mode, and the switch Q7 may be pulse-width modulated so as to turn off (e.g., transition from an activated state to a deactivated state) at a same time as switch Q8. The switch Q7 may be activated by a PWM signal having a different frequency as respective signals activating switches Q6 and Q8, and the PWM signal provided to switch Q7 may have a different duty cycle than a PWM signal provided to switch Q8. In some embodiments, the switching frequency of the signal provided to switch Q7 may be less than a switching frequency of respective signals provided to switches Q6 and Q8. For example, the pulse width of the pulse modulated signal provided to switch Q7 may have a longer duration than the pulse width of the pulse modulated signal provided to switch Q8. In some embodiments, switch Q7 may be in an active state (e.g., simultaneously active) at a same time as switch Q6 and at a same time as switch Q8 for at least a portion of the charging mode. By adjusting the duty cycle of the switch Q7, the gain of the half bridge CLLC converter with full bridge synchronous rectification can be further adjusted during the discharging mode. The operating method of FIG. 8D may achieve ZVS for switches Q6 and Q8. In addition, since switch Q7 is pulse-width modulated at a lower switching frequency, the switching loss of Q7 can be reduced and/or minimized.

The switches Q6 and Q8 may be activated during the discharging mode according to respective pulse width modulated signals so as to transfer power from the secondary side of the transformer T1 to the primary stage 120. In some embodiments, a duty cycle of a signal provided to switches Q6 and Q8 may be approximately 50%. In addition, during the discharging mode, the switches Q1, Q2, Q3, and Q4 may be activated according to respective pulse width modulated signals so as to operate as a synchronous rectifier.

FIGS. 8A-8D illustrate embodiments in which one switch is inactive for the duration of the charging mode and one switch is inactive for the duration of the discharging mode (e.g., switch Q2 in the charging mode and switch Q5 in the discharging mode). In some embodiments, as discussed herein with respect to FIGS. 6 and 7, the switch (switch Q2 in charging mode and switch Q5 in discharging mode) may be operated (e.g., via a PWM signal) during a portion of a duty cycle.

Figure 8E:
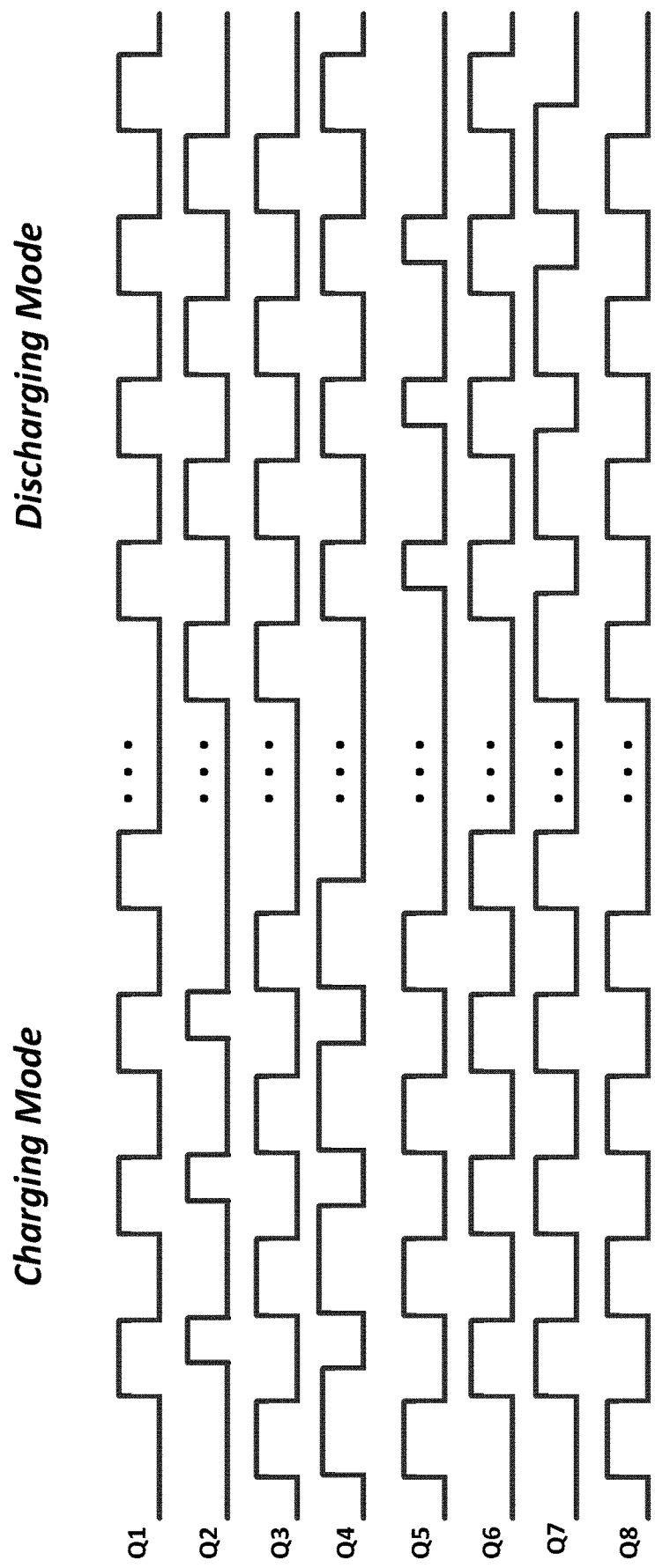

For example, FIG. 8E illustrates an embodiment similar to that of FIG. 8B.

Namely, during the charging mode, the switch Q4 is controlled so as to have a same frequency as switch Q3 and to transition from an inactive to an active state at the same time as switch Q3, but with a different duty cycle. Similarly, switch Q7 is controlled so as to have a same frequency as switch Q8 and to transition from an inactive to an active state at the same time as switch Q8, but with a different duty cycle. Unlike FIG. 8B, however, in the embodiment of FIG. 8E the switch Q2 is controlled by a PWM signal to have a complementary switching pattern to switch Q4 in the charging mode, and the switch Q5 is controlled by a PWM signal to have a complementary switching pattern to switch Q7 in the discharging mode. Thus, in the charging mode, the switch Q2 may be controlled to be active (e.g., turned on) when switch Q4 is inactive (e.g., turned off) and may be controlled to be inactive when switch Q4 is active. Similarly, in the charging mode, the switch Q5 may be controlled to be active (e.g., turned on) when switch Q7 is inactive (e.g., turned off) and may be controlled to be inactive when switch Q7 is active.

Figure 8F:
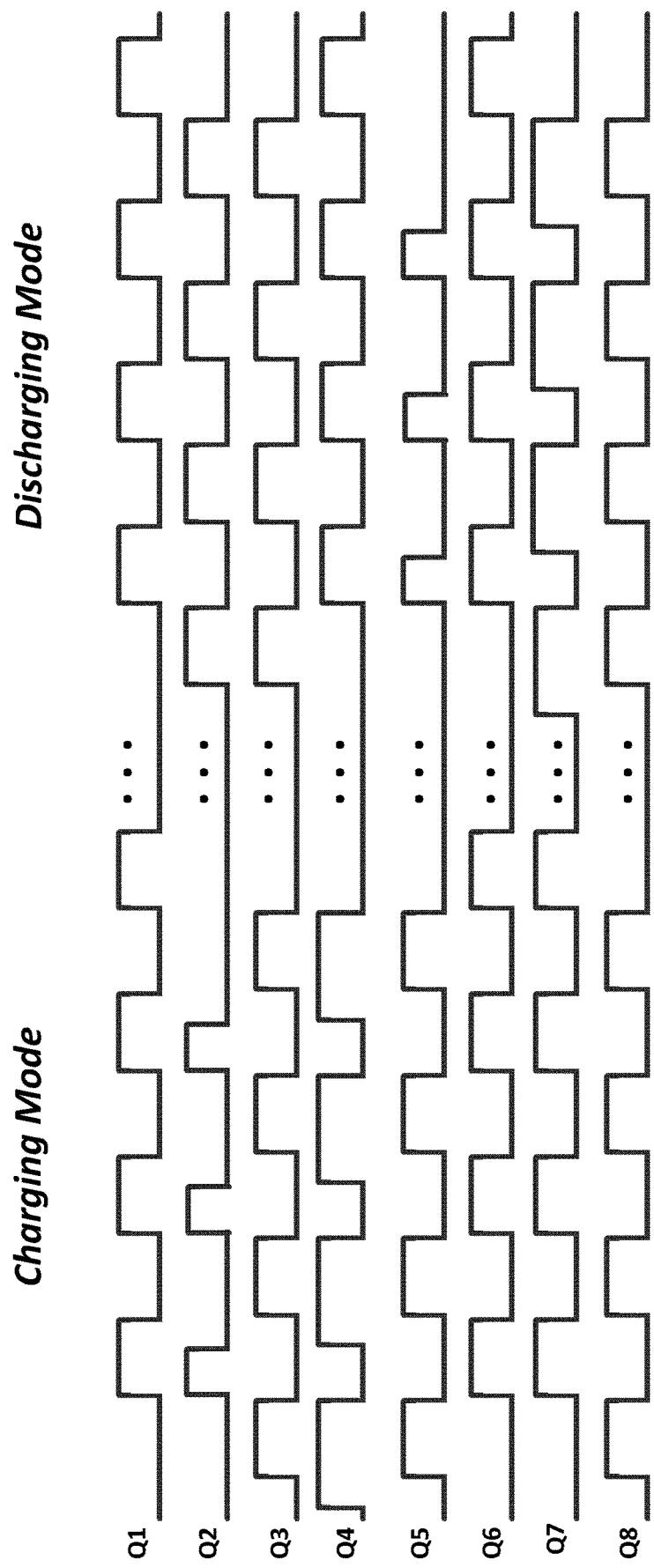

FIG. 8F illustrates an embodiment similar to that of FIG. 8C. Namely, during the charging mode, the switch Q4 is controlled so as to have a same frequency as switch Q3 and to transition from an active to an inactive state at the same time as switch Q3, but with a different duty cycle. Similarly, switch Q7 is controlled so as to have a same frequency as switch Q8 and to transition from an active to an inactive state at the same time as switch Q8, but with a different duty cycle. Unlike FIG. 8C, however, in the embodiment of FIG. 8F the switch Q2 is controlled by a PWM signal to have a complementary switching pattern to switch Q4 in the charging mode, and the switch Q5 is controlled by a PWM signal to have a complementary switching pattern to switch Q7 in the discharging mode.

Figure 8G:
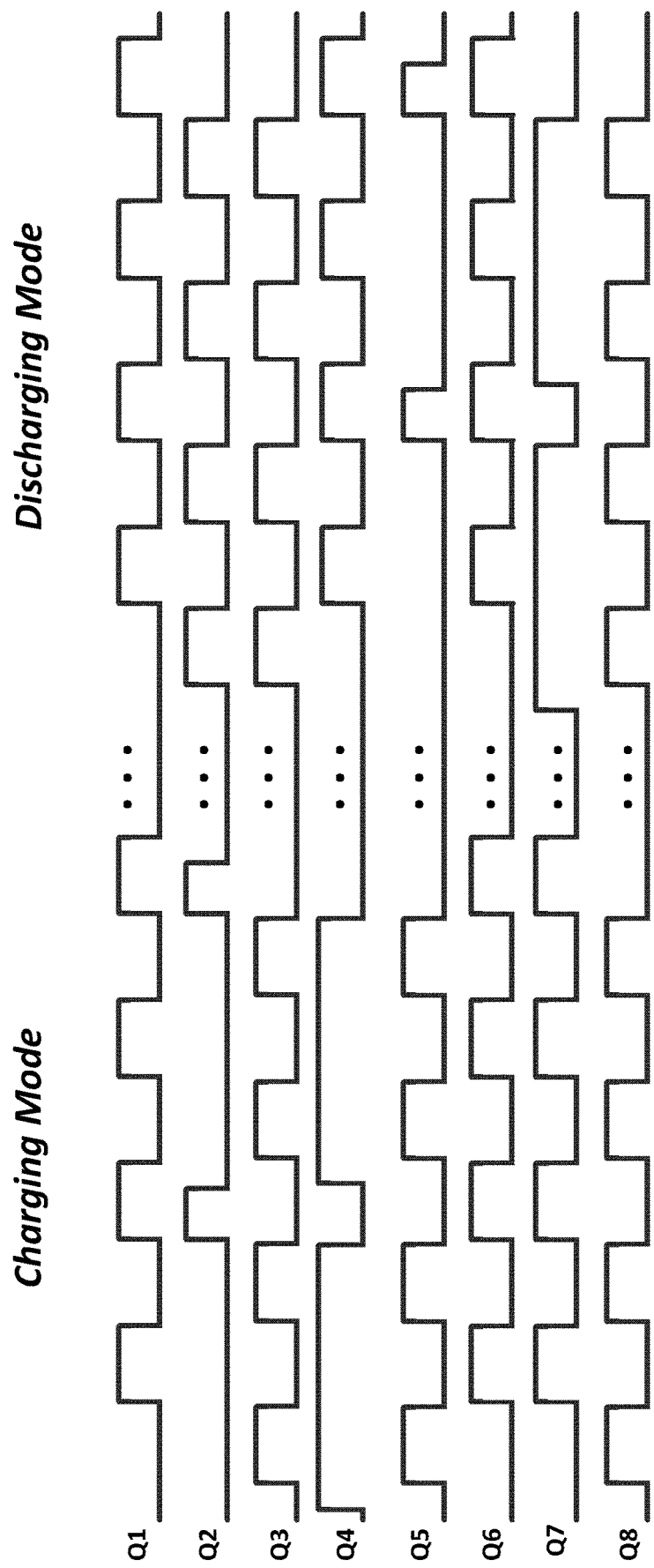

FIG. 8G illustrates an embodiment similar to that of FIG. 8D. Namely, during the charging mode, the switch Q4 is controlled so as to have a different duty cycle and frequency than both switches Q1 and Q3 such that switch Q4 is active during a portion of the duty cycle of switch Q3 and a portion of the duty cycle of switch Q1. Similarly, switch Q7 is controlled so as to have a different duty cycle and frequency than both switches Q6 and Q8 such that switch Q4 is active during a portion of the duty cycle of switch Q6 and a portion of the duty cycle of switch Q8. Unlike FIG. 8D, however, in the embodiment of FIG. 8G, the switch Q2 is controlled by a PWM signal to have a complementary switching pattern to switch Q4 in the charging mode, and the switch Q5 is controlled by a PWM signal to have a complementary switching pattern to switch Q7 in the discharging mode.

Figure 8H:
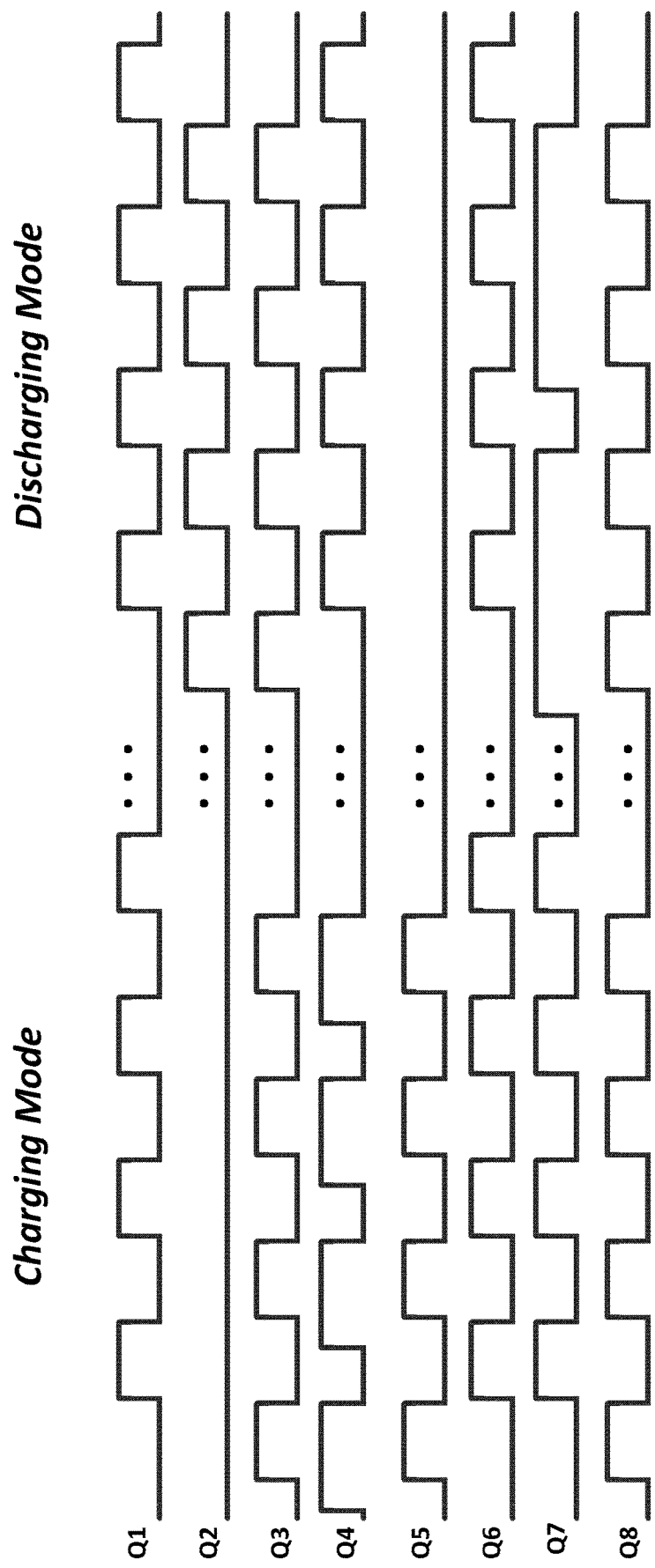

In FIGS. 8A-8G, different methods for operating the switching circuits of the present invention have been illustrated. In FIGS. 8A-8G a same switching method was illustrated as being applied to the primary stage 120 during the charging mode as is applied to the secondary stage 130 during the discharging mode, but the present invention is not limited thereto. FIG. 8H is a timing diagram of an additional method for operating the bidirectional CLLC converter of FIG. 1 according to some embodiments the present invention. In FIG. 8H, a different switching method is applied during the charging mode than the discharging mode. In other words, in some embodiments, a PWM signal applied to switch Q4 during the charging mode may be different (e.g., have a different frequency or different duty cycle) than a PWM signal applied to switch Q7 during the discharging mode. In FIG. 8H, switch Q4 is activated during the charging mode with a method similar to that described with respect to FIG. 8C (e.g., with switch Q4 being deactivated at a same time as switch Q3 but with a same frequency as switch Q3) while switch Q7 is activated during the discharging mode with a method similar to that described with respect to FIG. 8D (e.g., with switch Q7 being in an active state during portions in which both switches Q6 and Q7 are in an active state, but being switched at a different frequency than switches Q6 and Q7). It will be understood that different combinations of operations may be utilized in the charging mode vs. the discharging mode without deviating from the present invention. For example, in some embodiments, the switch Q2 may be maintained in a deactivated state during the charging mode (as discussed herein with respect to FIGS. 8A-8D), and the switch Q5 may be operated in a manner complementary to switch Q7, as discussed herein with respect to FIGS. 8E-8G.

Similarly, though FIGS. 8A-8H illustrate a single switching method being used during the charging mode and/or the discharging mode, it will be understood that the signal switching mode (e.g., the signal with which Q4 and/or Q7 is activated) may be modified during the charging and/or discharging mode. For example, in some embodiments the controller 110 may be configured to provide a signal to switch Q4 according to a first switching method (e.g., similar to that described with respect to FIG. 8B) for a first part of the charging mode, and the controller 110 may be configured to provide a signal to switch Q4 according to a second switching method (e.g., similar to that described with respect to FIG. 8C) for a second part of the charging mode. In some embodiments, the controller 110 may be configured to provide a signal to switch Q2 to maintain switch Q2 in a deactivated state for a first part of the charging mode (as discussed herein with respect to FIGS. 8A-8D) and may transition to provide a signal to switch Q2 to operate switch Q2 in a complementary manner to switch Q4 (as discussed herein with respect to FIGS. 8E-8G) for a second part of the charging mode. It will be understood that switch Q7 may be similarly controlled during the discharging mode.

Referring back to FIG. 1, the controller 110 may be configured to provide the activation signals (e.g., pulse width modulated signals) to the switches Q1, Q2, Q3, Q4, Q5, Q6, Q7, and Q8 described herein. In some embodiments, the controller 110 may be configured to provide the activation signal to control operations of the device substantially in compliance with the timing diagrams illustrated with respect to FIGS. 8A-8H.

In some embodiments, the controller 110 may be configured to sample and/or analyze an output voltage and/or gain of the device to determine if the gain is adequate for the current load. In some embodiments, the controller 110 may be configured to sample (e.g., by a feedback loop) the required gain in either the charging mode or the discharging mode. By analyzing the gain needed by the device, the operating mode of the device may be shifted. In the discussion that follows, operations will be discussed with respect to operation during the charging mode, but it will be understood that similar methods may be utilized with respect to the discharging mode. Moreover, the charging modes and the discharging modes may be controlled independently of one another such that the control decisions made by the controller 110 with respect to the charging mode can be different than those made by the controller 110 with respect to the discharging mode.

For example, in a first mode of operation, the controller 110 may be configured to operate the device conventionally as a full-bridge bidirectional CLLC converter. In a charging mode, the primary side may be operated conventionally (e.g., as a full bridge converter) and the secondary side may be operated as a synchronous rectifier. A similar operation may be utilized in the discharging mode, with the secondary side acting as the full-bridge converter and the primary side acting as the synchronous rectifier.

The controller 110 may analyze the required output voltage and/or gain during operation of the device. If the required output voltage and/or gain is lower than what can be supported by full bridge operation, then the controller 110 may be configured to switch the operation to a half bridge operation on the primary side. For example, the controller 110 may alter the control signals to control the activation of the switch Q4 according to one of the embodiments of FIGS. 8A-8H. For example, the controller 110 may switch to an operation illustrated with respect to FIG. 8A.

The controller 110 may continue to analyze the required output voltage and/or gain during operation of the device. If the required output voltage and/or gain is still lower than what can be supplied by the operating mode of FIG. 8A, then the controller 110 may be configured to switch the configuration of the converter to activate switch Q4 utilizing a PWM signal as illustrated in FIG. 8D.

The controller may continue to analyze the required output voltage and/or gain during operation of the device. If the required output voltage and/or gain is still lower than what can be supplied by the operating mode of FIG. 8D, then the controller 110 may be configured to switch the configuration of the converter to activate switch Q4 utilizing a PWM signal as illustrated in FIG. 8C. Though the operating method illustrated in FIG. 8C has a higher switching frequency for switch Q4 as compared to the operating method illustrated in FIG. 8D, this may still be acceptable. With a lower output voltage, the output power may be lower, which may lower the current stress and power loss on switch Q4.

Though the previous discussion with respect to the operations of the controller 110 has focused on transitioning between operating modes of the present invention, it will be understood that the present invention is not limited thereto. For example, in some embodiments, the controller 110 may transition between an embodiment of controller operation discussed herein (e.g., one of the operating modes of FIGS. 8A-8H) and the conventional operation of the bidirectional CLLC converter. In some embodiments, this transition may be made based on the required gain of the device.

In some embodiments, the controller 110 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices. In some embodiments, the controller 110 may be implemented via a circuit including analog and/or digital circuit elements.

As illustrated herein, for example, in FIGS. 1-7, both the primary stage 120 and the secondary stage 130 have a resonant tank as part of the circuit. The resonant tank includes the capacitors and inductors coupled to, and part of, the transformer Ti. In FIG. 1, for example, the resonant tanks of the primary stage 120 and secondary stage 130 include, respectively, an inductor and capacitor in series on opposite sides of the winding of the transformer Ti. While this is one embodiment of the resonant tank, those skilled in the art will recognize that other embodiments of resonant tanks may be utilized without deviating from the scope of the present invention. FIGS. 9A to 9F are circuit diagrams of additional configurations of the resonant tanks of the bidirectional CLLC converter according to some embodiments of the present invention.

Figure 9A:
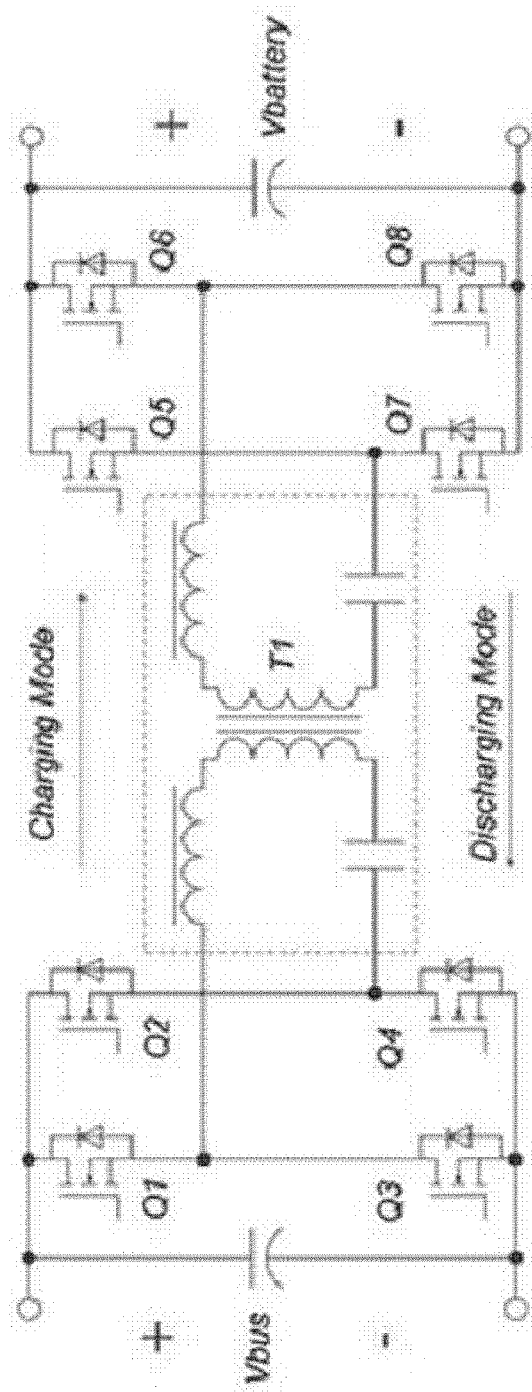
FIGS. 9A to 9F are circuit diagrams of additional configurations of the resonant tanks of the bidirectional CLLC converter according to some embodiments of the present invention.
Figure 9B:
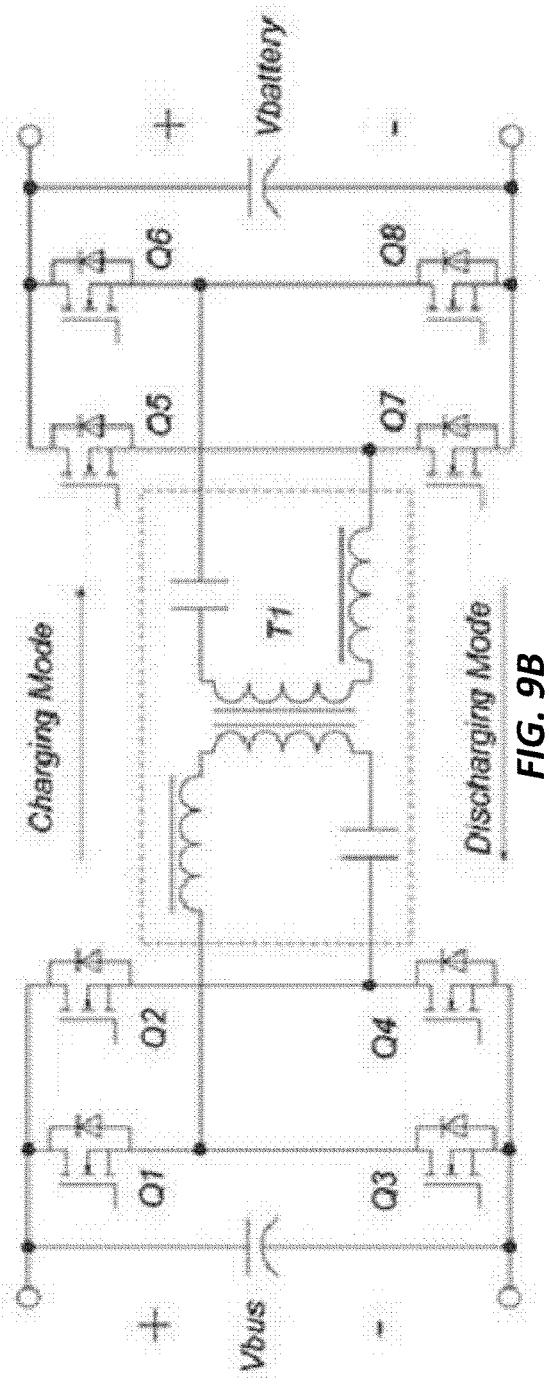
Figure 9C:
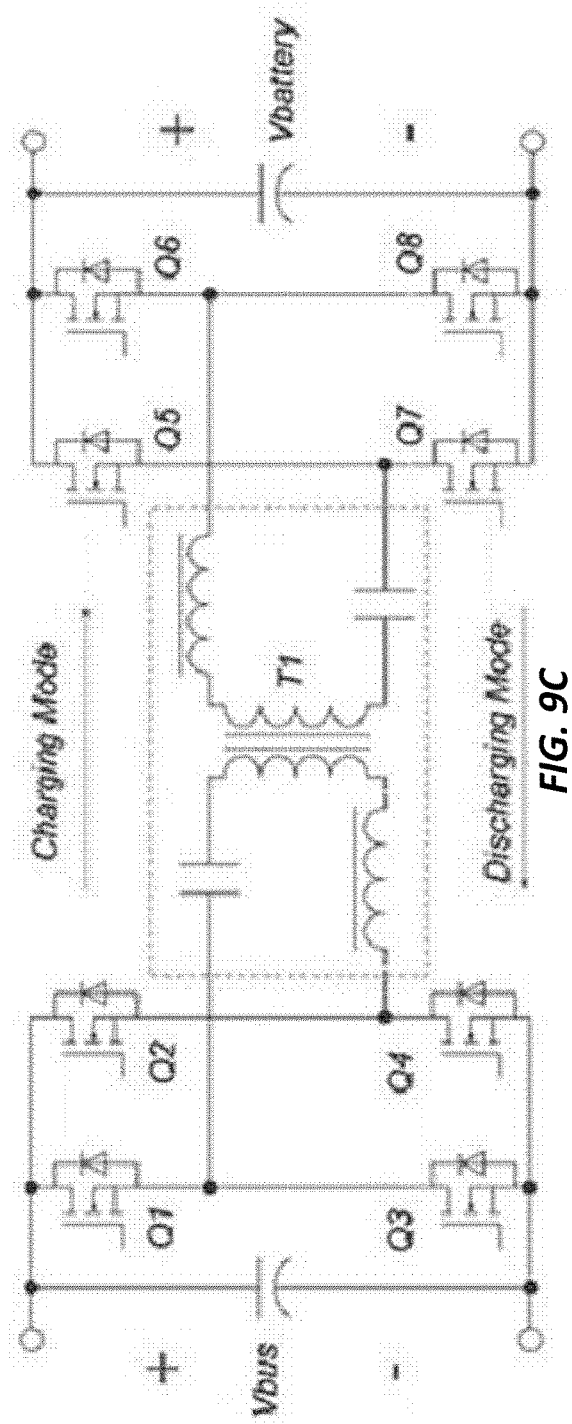
Figure 9D:
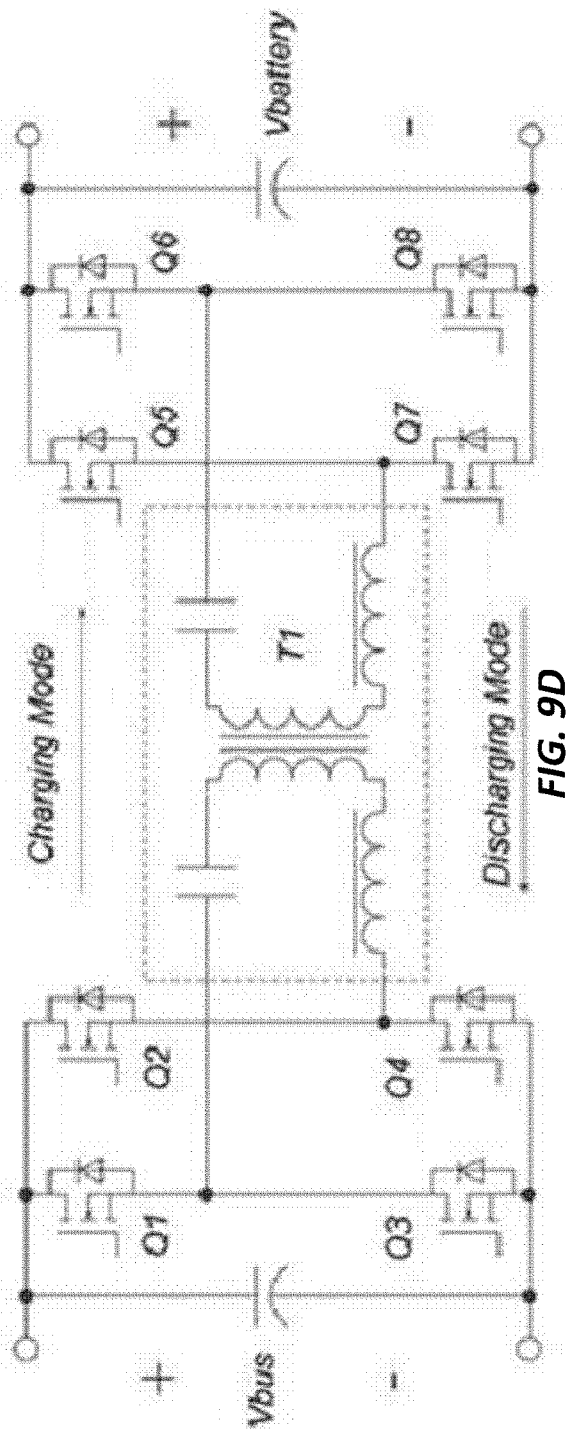
Figure 9E:
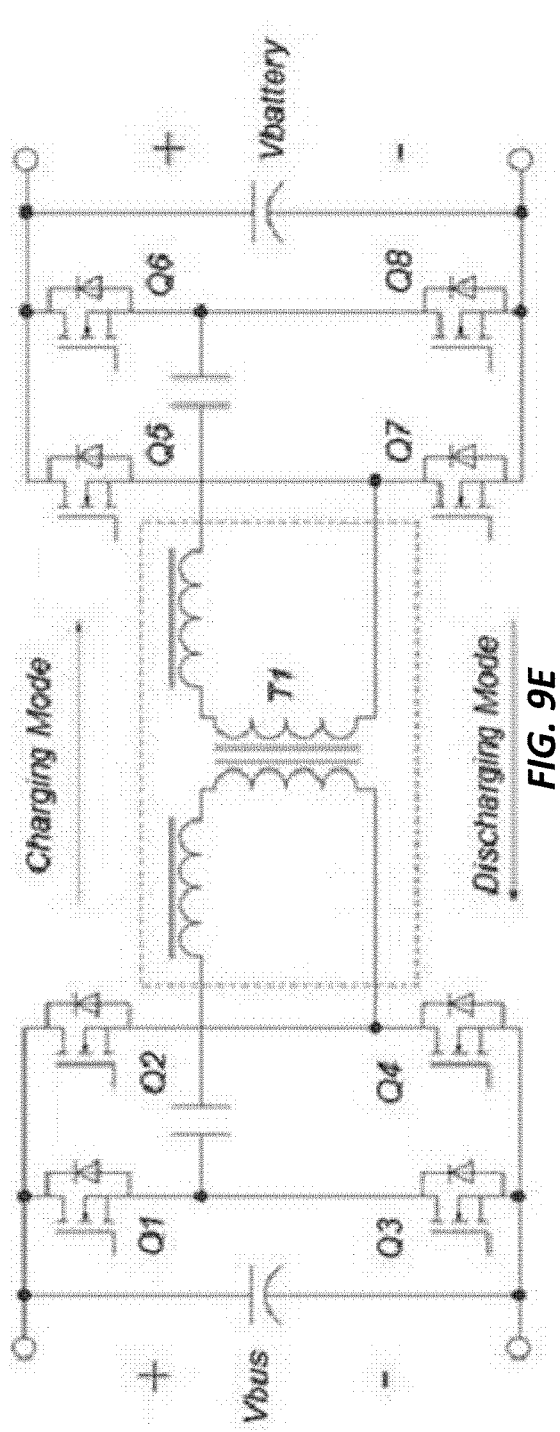
Figure 9F:
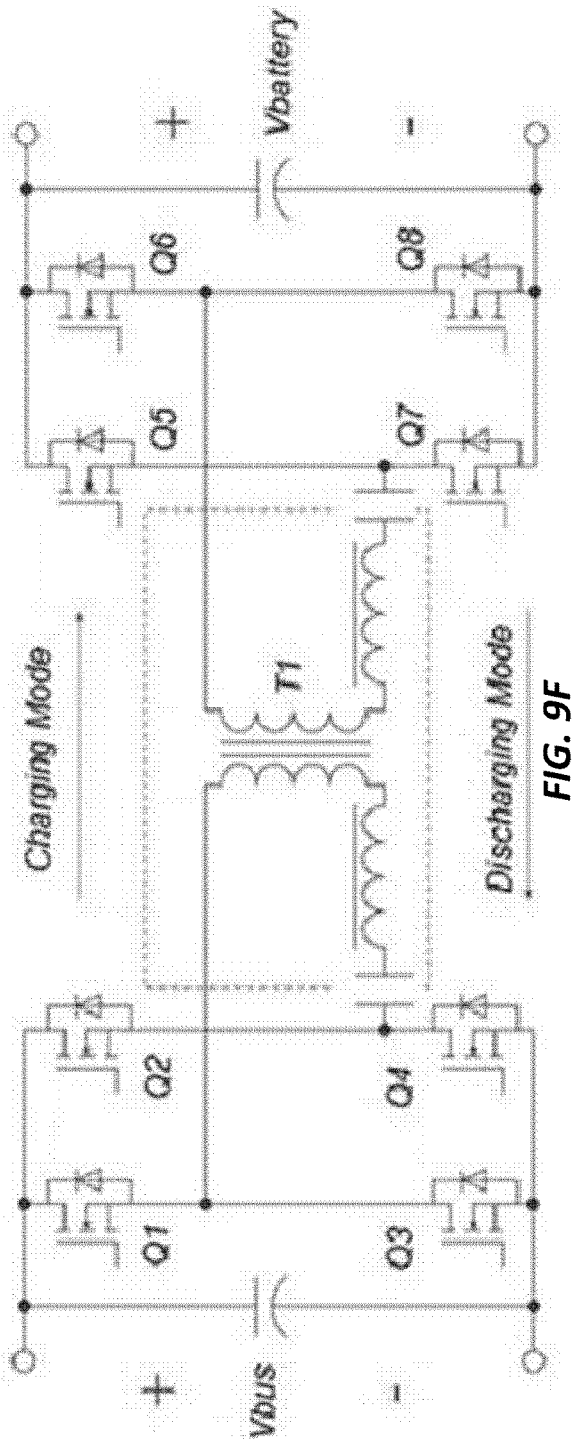

For example, FIG. 9A illustrates an inductor and capacitor in series on opposite sides of the winding of the transformer T1 in a similar manner as illustrated in FIGS. 1-7. FIGS. 9B to 9D illustrate that the arrangement of the capacitor and inductor can be reversed on one or both sides of the transformer Ti. FIGS. 9E and 9F illustrate that the capacitor and inductor can be in series on the same side of the transformer Ti.

The embodiments of FIGS. 9A-9F are meant to be examples and are not intended to limit the scope of the invention. For example, the arrangements of the resonant tank of the primary stage 120 may be different than that of the secondary stage 130. Similarly, though a single capacitor and inductor are illustrated in series with the transformer Ti, it will be understood that either element could actually be multiple elements (e.g., more than one capacitor and/or more than one inductor) and the individual elements may be arranged in various configurations with respect to the transformer Ti. Other configurations of resonant tanks may be utilized within the bidirectional CLLC converters described herein without deviating from the scope of the invention.

The present invention achieves flexible control utilizing the controller 110 based on the operating conditions of the device. For example, the gain range of the full bridge bidirectional CLLC converter becomes much wider in both charging and discharging mode. As a result, the transformer ratio and the primary and secondary resonant tank design becomes more simplified. Also, the turn-off loss of the switches can be reduced and/or minimized. As compared to a two stage solution or a relay based solution, the system efficiency and power density may be improved by the embodiments of the present invention described herein, and the system cost may also be lower. The embodiments described herein may be useful for power conversion applications with a wide input voltage range or a wide output voltage range, such as but not limited to a 3-phase AC input EV OBC. In a 3-phase AC input EV OBC, a full power rating may be needed in charging mode with a 3-phase input, but a derated power rating may be acceptable in V2L DC-AC discharging mode. Thus, even in a half bridge configuration, the requirement on the power switches does not increase as compared to the full power rating in a full bridge configuration.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "about," "substantially," and "approximately," as used herein with respect to a value or number, mean that the value or number can vary by as much as +/−fifteen percent (15%).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms first, second, etc., may be used herein to describe various elements, components, regions, layers, and/or sections, these elements, components, regions, layers, and/or sections should not be limited by these terms. Rather, these terms are only used to distinguish one element, component, region, layer, and/or section, from another element, component, region, layer, and/or section. Thus, a first element, component, region, layer, or section discussed herein could be termed a second element, component, region, layer, or section without departing from the teachings of the present invention. The sequence of operations (or steps) is not limited to the order presented in the claims or figures unless specifically indicated otherwise.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A bidirectional power converter comprising:
a first switch circuit coupled to a second switch circuit via a transformer,
wherein the first switch circuit is configured to transfer power to the second switch circuit during a charging mode,
wherein the second switch circuit is configured to transfer power to the first switch circuit during a discharging mode,
wherein the first switch circuit is configured to operate in a half bridge configuration during a first portion of the charging mode, and in a full bridge synchronous rectifier configuration during a first portion of the discharging mode,
wherein the second switch circuit is configured to operate in a half bridge configuration during the first portion of the discharging mode, and
wherein a first switch of the first switch circuit is configured to be active during at least part of the first portion of the discharging mode.

2. The bidirectional power converter of claim 1, wherein the second switch circuit is configured to operate as a full bridge synchronous rectifier during the first portion of the charging mode, and
wherein a switch of the second switch circuit is configured to be active during at least part of the first portion of the charging mode.

3. The bidirectional power converter of claim 1, wherein the first switch and a second switch of the first switch circuit are configured to be simultaneously active during part of the first portion of the charging mode.

4. The bidirectional power converter of claim 3, wherein the first switch is configured to transition from a deactivation state to an activation state at substantially the same time that the second switch is configured to transition from a deactivation state to an activation state during the first portion of the charging mode.

5. The bidirectional power converter of claim 3, wherein the first switch is configured to transition from an activation state to a deactivation state at substantially the same time that the second switch is configured to transition from an activation state to a deactivation state during the first portion of the charging mode.

6. The bidirectional power converter of claim 3, wherein, during the first portion of the charging mode, the first switch is pulse-width modulated at a first frequency with a first duty cycle and the second switch is pulse-width modulated at a second frequency with a second duty cycle,
wherein the first frequency is substantially the same as the second frequency, and
wherein the first duty cycle has a different duration than the second duty cycle.

7. The bidirectional power converter of claim 3, wherein the first switch and a third switch of the first switch circuit are configured to be simultaneously active during another part of the first portion of the charging mode.

8. The bidirectional power converter of claim 1, wherein a fourth switch and a fifth switch of the second switch circuit are configured to be simultaneously active during part of the first portion of the discharging mode.

9. The bidirectional power converter of claim 8, wherein the fourth switch is configured to transition from a deactivation state to an activation state at substantially the same time that the fifth switch is configured to transition from a deactivation state to an activation state during the first portion of the discharging mode.

10. The bidirectional power converter of claim 8, wherein the fourth switch is configured to transition from an activation state to a deactivation state at substantially the same time that the fifth switch is configured to transition from an activation state to a deactivation state during the first portion of the discharging mode.

11. The bidirectional power converter of claim 8, wherein, during the first portion of the discharging mode, the fourth switch is pulse-width modulated at a fourth frequency with a fourth duty cycle and the fifth switch is pulse-width modulated at a fifth frequency with a fifth duty cycle,
wherein the fourth frequency is substantially the same as the fifth frequency, and
wherein the fourth duty cycle has a different duration than the fifth duty cycle.

12. The bidirectional power converter of claim 8, wherein the fourth switch and a sixth switch of the second switch circuit are configured to be simultaneously active during another part of the first portion of the discharging mode.

13. The bidirectional power converter of claim 1, wherein the first switch of the first switch circuit is configured to be inactive throughout the first portion of the charging mode.

14. The bidirectional power converter of claim 1, wherein a switch of the second switch circuit is configured to be inactive throughout the first portion of the discharging mode.

15. The bidirectional power converter of claim 1, wherein the first switch circuit comprises:
the first switch having a first terminal coupled to a first terminal of an input port and a second terminal coupled to a first terminal of a first winding of the transformer;
a second switch having a first terminal coupled to the first terminal of the input port and a second terminal coupled to a second terminal of the first winding of the transformer;
a third switch having a first terminal coupled to the first terminal of the first winding of the transformer and a second terminal coupled to a second terminal of the input port; and
a fourth switch having a first terminal coupled to the second terminal of the first winding of the transformer and a second terminal coupled the second terminal of the input port.

16. The bidirectional power converter of claim 15, wherein the second switch circuit comprises:
a fifth switch having a first terminal coupled to a first terminal of an output port and a second terminal coupled to a first terminal of a second winding of the transformer;
a sixth switch having a first terminal coupled to the first terminal of the output port and a second terminal coupled to a second terminal of the second winding of the transformer;

a seventh switch having a first terminal coupled to the first terminal of the second winding of the transformer and a second terminal coupled to a second terminal of the output port; and
an eighth switch having a first terminal coupled to the second terminal of the second winding of the transformer and a second terminal coupled the second terminal of the output port.

17. A bidirectional power converter comprising:
a first switch circuit coupled to a second switch circuit via a transformer,
wherein the first switch circuit is configured to transfer power to the second switch circuit during a charging mode,
wherein the second switch circuit is configured to transfer power to the first switch circuit during a discharging mode,
wherein a first switch of the first switch circuit is configured to be active during at least part of the discharging mode, and
wherein a duty cycle of the first switch is configured to be less than 50% during the charging mode.

18. The bidirectional power converter of claim 17, wherein a first switch of the second switch circuit is configured to be opened during a duration of the discharging mode.

19. The bidirectional power converter of claim 17, wherein a second switch of the first switch circuit is configured to be operated so as to be active during a portion of a duty cycle of a third switch of the first switch circuit.

20. The bidirectional power converter of claim 17, wherein a second switch of the first switch circuit is configured to be operated so as to be active during a portion of a duty cycle of a third switch and a fourth switch of the first switch circuit.

21. The bidirectional power converter of claim 17, wherein a second switch of the second switch circuit is configured to be operated so as to be active during a portion of a duty cycle of a third switch of the second switch circuit.

22. The bidirectional power converter of claim 17, wherein a second switch of the second switch circuit is configured to be operated so as to be active during a portion of a duty cycle of a third switch and a fourth switch of the second switch circuit.

23. The bidirectional power converter of claim 17, wherein the first switch circuit comprises a first full-bridge switch circuit, and wherein the second switch circuit comprises a second full-bridge switch circuit.

24. The bidirectional power converter of claim 17, wherein the first switch of the first switch circuit is configured to be opened during an entirety of a duration of the charging mode.

25. A bidirectional power converter comprising:
a first switch circuit coupled to a second switch circuit via a transformer,
wherein the first switch circuit comprises a first switch, a second switch, a third switch, and a fourth switch and is configured to transfer power to the second switch circuit during a charging mode,
wherein the second switch circuit comprises a fifth switch, a sixth switch, a seventh switch, and an eighth switch and is configured to transfer power to the first switch circuit during a discharging mode,
wherein the third switch and the fourth switch are configured to be simultaneously active during a first portion of the charging mode, wherein the first switch and the fourth switch are configured to be simultaneously active during a second portion of the charging mode, wherein the fourth switch and the third switch are configured to be controlled by respective pulse width modulation (PWM) signals, and wherein a first PWM signal of the fourth switch has a pulse width that is longer or shorter than a pulse width of a second PWM signal of the third switch during the charging mode.

26. The bidirectional power converter of claim 25, wherein the third switch and the fourth switch are configured to be simultaneously inactive for part during a third portion of the charging mode.

27. The bidirectional power converter of claim 25, wherein the first switch circuit is configured to operate as a full bridge synchronous rectifier during a portion of the discharging mode.

28. The bidirectional power converter of claim 25, wherein the second switch circuit is configured to operate as a full bridge synchronous rectifier during a portion of the charging mode.

29. The bidirectional power converter of claim 25, wherein the fourth switch is configured to transition from a deactivation state to an activation state at substantially the same time that the third switch is configured to transition from a deactivation state to an activation state.

30. The bidirectional power converter of claim 25, wherein the fourth switch is configured to transition from an activation state to a deactivation state at substantially the same time that the third switch is configured to transition from an activation state to a deactivation state.

31. The bidirectional power converter of claim 25, wherein the fourth switch is pulse-width modulated at a first frequency and the third switch is pulse-width modulated at a second frequency, and wherein the first frequency is substantially the same as the second frequency.

32. The bidirectional power converter of claim 25, wherein the seventh switch and the eighth switch of the second switch circuit are configured to be simultaneously active during a portion of the discharging mode.

33. The bidirectional power converter of claim 32, wherein the seventh switch and the sixth switch of the second switch circuit are configured to be simultaneously active another portion of the discharging mode.

34. The bidirectional power converter of claim 25, wherein the seventh switch is configured to transition from a deactivation state to an activation state at substantially the same time that the eighth switch is configured to transition from a deactivation state to an activation state.

35. The bidirectional power converter of claim 25, wherein the seventh switch is configured to transition from an activation state to a deactivation state at substantially the same time that the eighth switch is configured to transition from an activation state to a deactivation state.

36. The bidirectional power converter of claim 25, wherein the seventh switch is pulse-width modulated at a fourth frequency with a fourth duty cycle and the eighth switch is pulse-width modulated at a fifth frequency with a fifth duty cycle, wherein the fourth frequency is substantially the same as the fifth frequency, and wherein the fourth duty cycle has a different duration than the fifth duty cycle.

37. The bidirectional power converter of claim 25, wherein the second switch of the first switch circuit is configured to be opened during a duration of the charging mode.

38. The bidirectional power converter of claim 25, wherein the fifth switch of the second switch circuit is configured to be opened during a duration of the discharging mode.

39. The bidirectional power converter of claim 25, wherein the second switch of the first switch circuit is configured to be controlled by a third PWM signal during the charging mode such that the second switch is activated when the fourth switch is inactive.

40. The bidirectional power converter of claim 25, wherein the fifth switch of the second switch circuit is configured to be controlled by a fourth PWM signal during the discharging mode such that the fifth switch is activated when the seventh switch is inactive.

41. A method of operating a bidirectional power converter comprising:

providing a first switch circuit having a full bridge configuration that is coupled to a second switch circuit having a full bridge configuration through a transformer;

operating the first switch circuit having the full bridge configuration of the bidirectional power converter in a half bridge configuration during a first portion of a charging mode;

transferring power through the transformer from the first switch circuit to the second switch circuit during the charging mode;

operating the second switch circuit having the full bridge configuration of the bidirectional power converter in a half bridge configuration during a first portion of a discharging mode; and transferring power through the transformer from the second switch circuit to the first switch circuit during the discharging mode, wherein a first switch of the first switch circuit is configured to be active during at least part of the discharging mode.

42. The method of claim 41, further comprising operating the first switch circuit to operate in a full bridge synchronous rectifier configuration during the first portion of the discharging mode.

43. The method of claim 41, further comprising operating the second switch circuit to operate as a full bridge synchronous rectifier during the first portion of the charging mode.

44. The method of claim 41, wherein operating the first switch circuit during the first portion of the charging mode comprises operating the first switch and a second switch of the first switch circuit to be simultaneously active during part of the first portion of the charging mode.

45. The method of claim 44, wherein operating the first switch circuit during the first portion of the charging mode further comprises operating the first switch to transition from a deactivation state to an activation state at substantially the same time that the second switch transitions from a deactivation state to an activation state during the first portion of the charging mode.

46. The method of claim 44, wherein operating the first switch circuit during the first portion of the charging mode further comprises operating the first switch to transition from an activation state to a deactivation state at substantially the same time that the second switch transitions from an activation state to a deactivation state during the first portion of the charging mode.

47. The method of claim 44, wherein operating the first switch circuit during the first portion of the charging mode further comprises operating the first switch and a third switch of the first switch circuit to be simultaneously active during another part of the first portion of the charging mode.

48. The method of claim 41, wherein operating the first switch circuit during the first portion of the charging mode further comprises operating the first switch of the first switch circuit to be opened during a duration of the first portion of the charging mode.

* * * * *